United States Patent
Vandergon et al.

(10) Patent No.: US 9,205,881 B2
(45) Date of Patent: Dec. 8, 2015

(54) FOLD-OUT TRAILER WITH RETRACTABLE WHEEL ASSEMBLY

(71) Applicant: AWOL Outdoors, Inc., Somerset, WI (US)

(72) Inventors: Cedar Jon Vandergon, New Brighton, MN (US); Kevin Arnold Fleischhacker, Maple Grove, MN (US); Scott Alan Davidson, Spring Grove, IL (US)

(73) Assignee: AWOL Outdoors, Inc., Somerset, WI (US)

( * ) Notice: Subject to any disclaimer, the term of this patent is extended or adjusted under 35 U.S.C. 154(b) by 48 days.

(21) Appl. No.: 13/668,530

(22) Filed: Nov. 5, 2012

(65) Prior Publication Data

US 2013/0154212 A1  Jun. 20, 2013

Related U.S. Application Data

(60) Provisional application No. 61/555,292, filed on Nov. 3, 2011.

(51) Int. Cl.
| | |
|---|---|
| *B62D 39/00* | (2006.01) |
| *B60G 99/00* | (2010.01) |
| *B62B 13/18* | (2006.01) |
| *B62D 63/06* | (2006.01) |
| *B62B 19/02* | (2006.01) |
| *B60G 7/00* | (2006.01) |
| *B60G 17/005* | (2006.01) |
| *B60P 3/34* | (2006.01) |

(52) U.S. Cl.
CPC ............... *B62D 39/00* (2013.01); *B60G 7/006* (2013.01); *B60G 17/005* (2013.01); *B60G 99/00* (2013.01); *B60P 3/341* (2013.01); *B62B 13/18* (2013.01); *B62B 19/02* (2013.01); *B62D 63/061* (2013.01); *B60G 2204/47* (2013.01); *B60G 2300/04* (2013.01)

(58) Field of Classification Search
CPC ...... B60G 99/00; B60G 7/006; B60G 17/005; B60G 2204/47; B62B 13/18; B62B 19/02; B62D 39/00; B60P 3/341
USPC .............. 296/165, 26.13, 173; 280/13, 491.1, 280/789, 638, 10, 8, 7.12, 43.21
See application file for complete search history.

(56) References Cited

U.S. PATENT DOCUMENTS

| | | | |
|---|---|---|---|
| 243,216 A | | 6/1881 | Conner |
| 2,248,080 A | | 9/1939 | Hathaway |
| 2,939,691 A | * | 6/1960 | Lewis ........................ 299/39.3 |
| 3,239,274 A | | 3/1966 | Weiss |
| 3,652,122 A | * | 3/1972 | Beauregard .................. 296/169 |
| 4,102,352 A | * | 7/1978 | Kirkham ........................ 135/97 |

(Continued)

*Primary Examiner* — Brodie Follman
*Assistant Examiner* — Brian Cassidy
(74) *Attorney, Agent, or Firm* — Steven M. Koehler; Westman, Champlin & Koehler, P.A.

(57) ABSTRACT

A trailer includes a trailer frame having a hitch. A stationary support base is joined to the trailer frame. Two support plates are slidably guided on the support base toward and away from each other. A pair of wheel assemblies is provided, wherein a wheel assembly is mounted to an end of each of the support plates remote from the other support plate such that a distance between the wheel assemblies varies with movement of the support plates on the support base. A pair of drive links is provided wherein a drive link is joined to each of the support plates. A drive mechanism is joined to the drive links and configured to selectively move the support plates toward or away from each other.

17 Claims, 32 Drawing Sheets

(56) References Cited

U.S. PATENT DOCUMENTS

| | | |
|---|---|---|
| 4,119,224 A | 10/1978 | Moody |
| 4,240,677 A | 12/1980 | Payne et al. |
| 4,358,133 A | 11/1982 | Stucky |
| 4,531,847 A | 7/1985 | F'Geppert |
| 4,577,876 A * | 3/1986 | Harris .............................. 280/13 |
| 4,772,038 A * | 9/1988 | MacDonald .................. 280/401 |
| 4,826,235 A | 5/1989 | Zwick |
| 5,118,245 A | 6/1992 | Dunkel |
| 5,487,692 A | 1/1996 | Mowrer et al. |
| 6,550,802 B2 | 4/2003 | Sheehan |
| 6,746,040 B2 | 6/2004 | Bordeleau et al. |
| 7,017,975 B2 | 3/2006 | Parmer |
| 7,186,030 B2 | 3/2007 | Schlanger |
| 7,216,896 B1 | 5/2007 | McGhie et al. |
| 7,967,369 B2 | 6/2011 | Davidson |
| 2008/0265617 A1 * | 10/2008 | Davidson ...................... 296/173 |

* cited by examiner

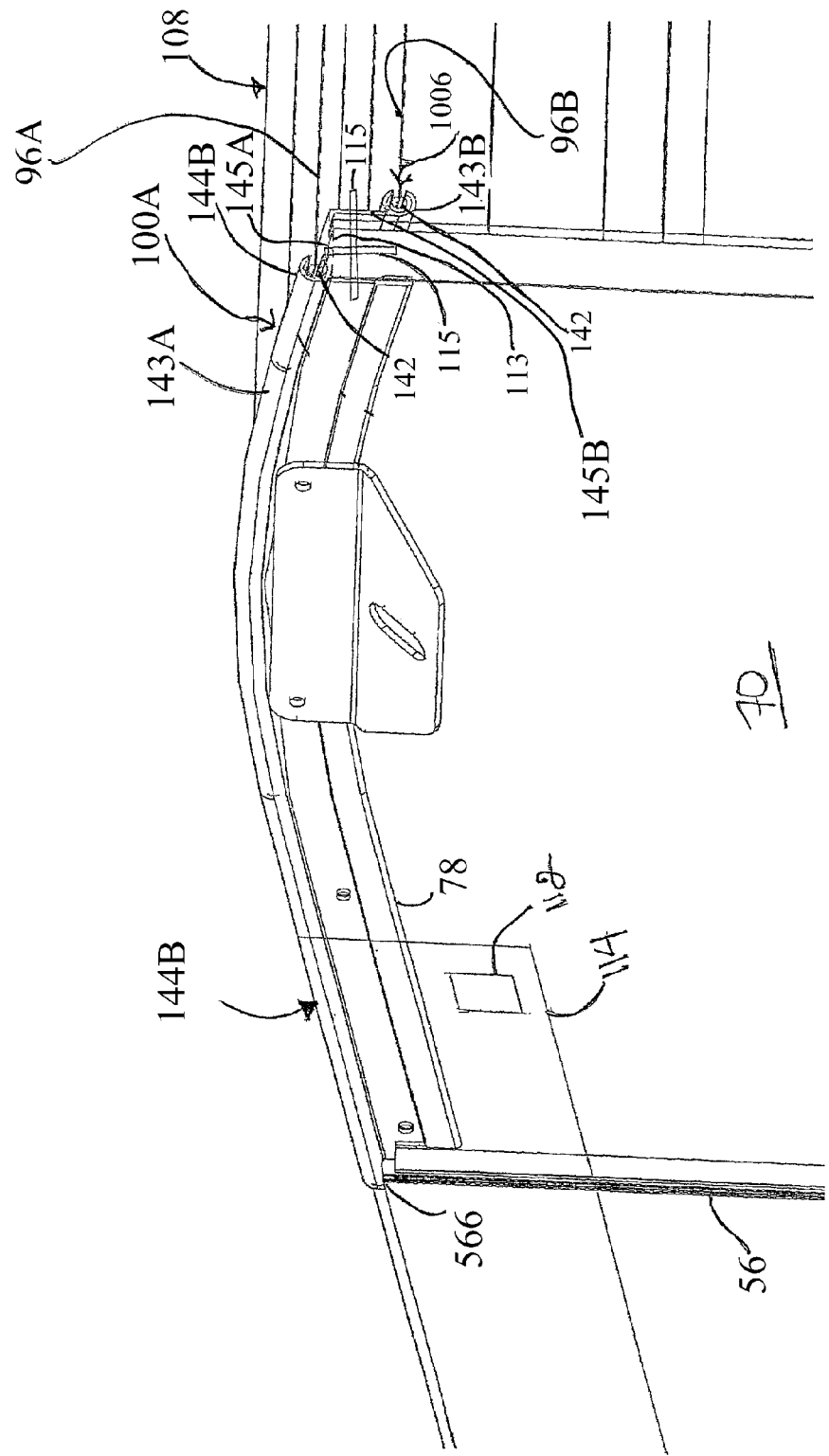

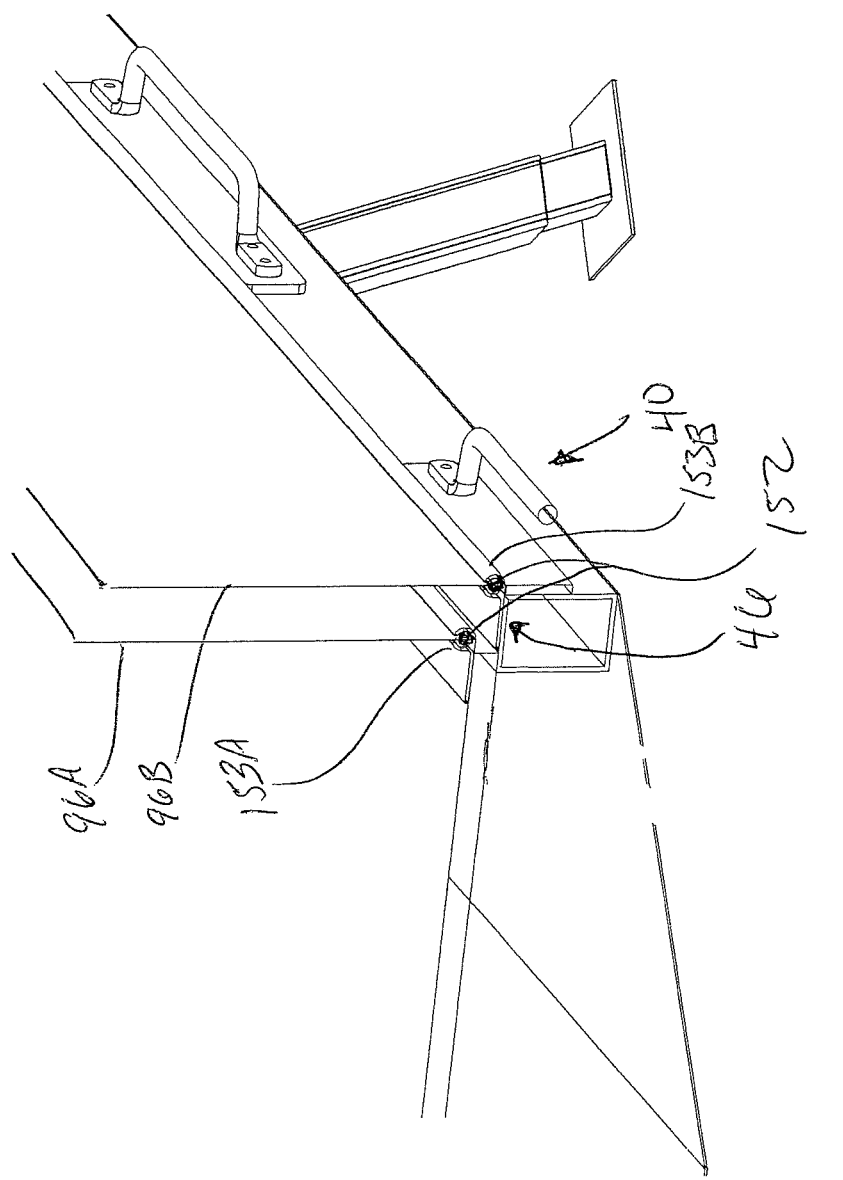

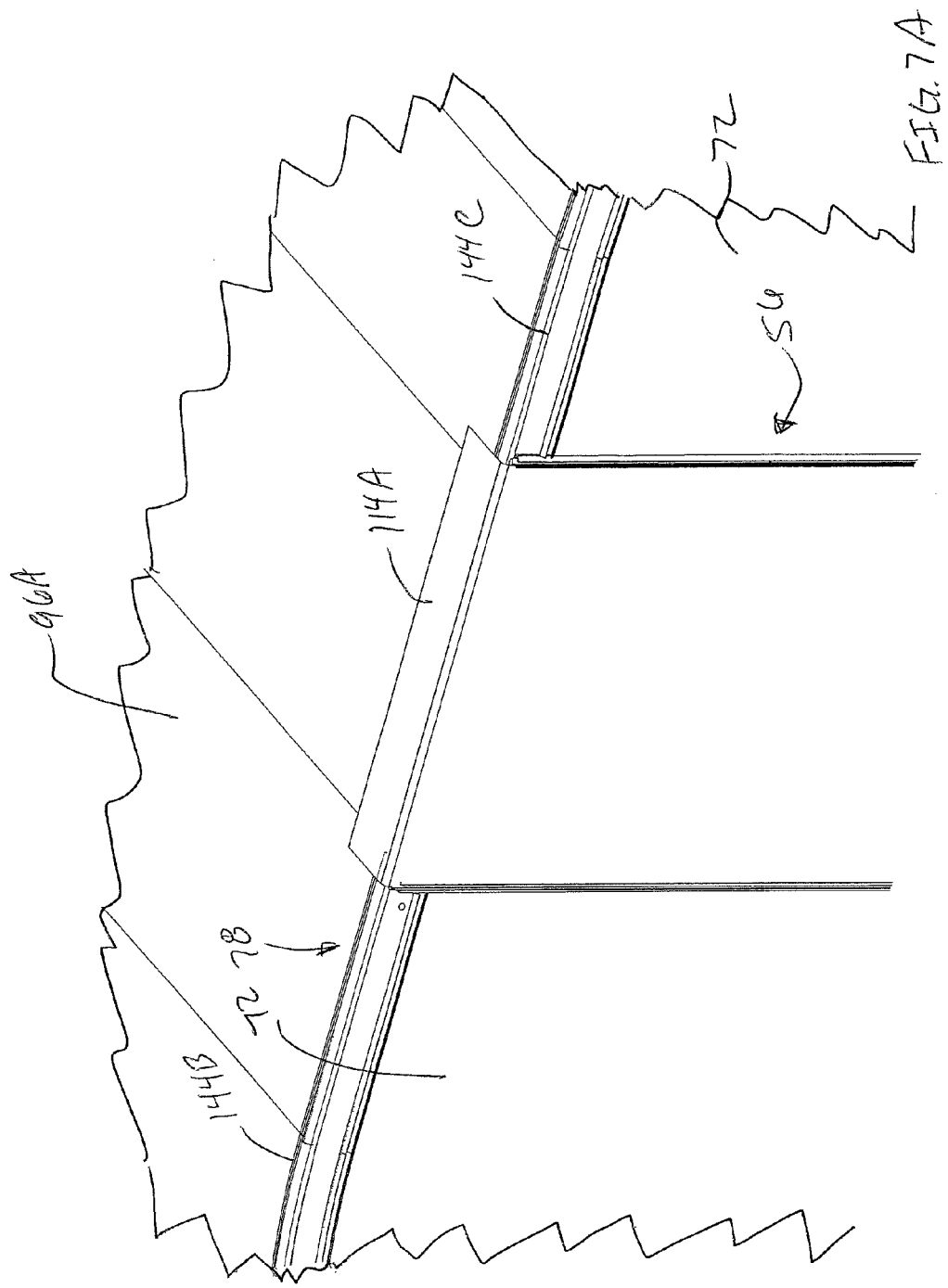

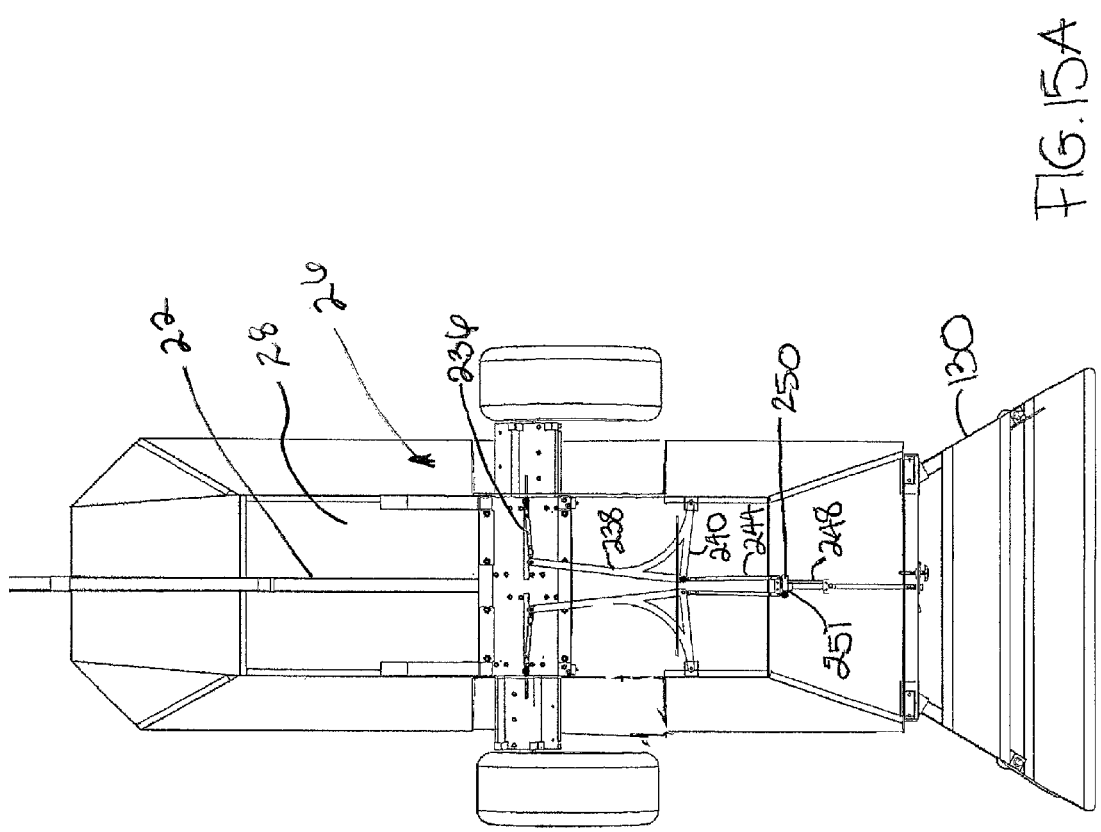

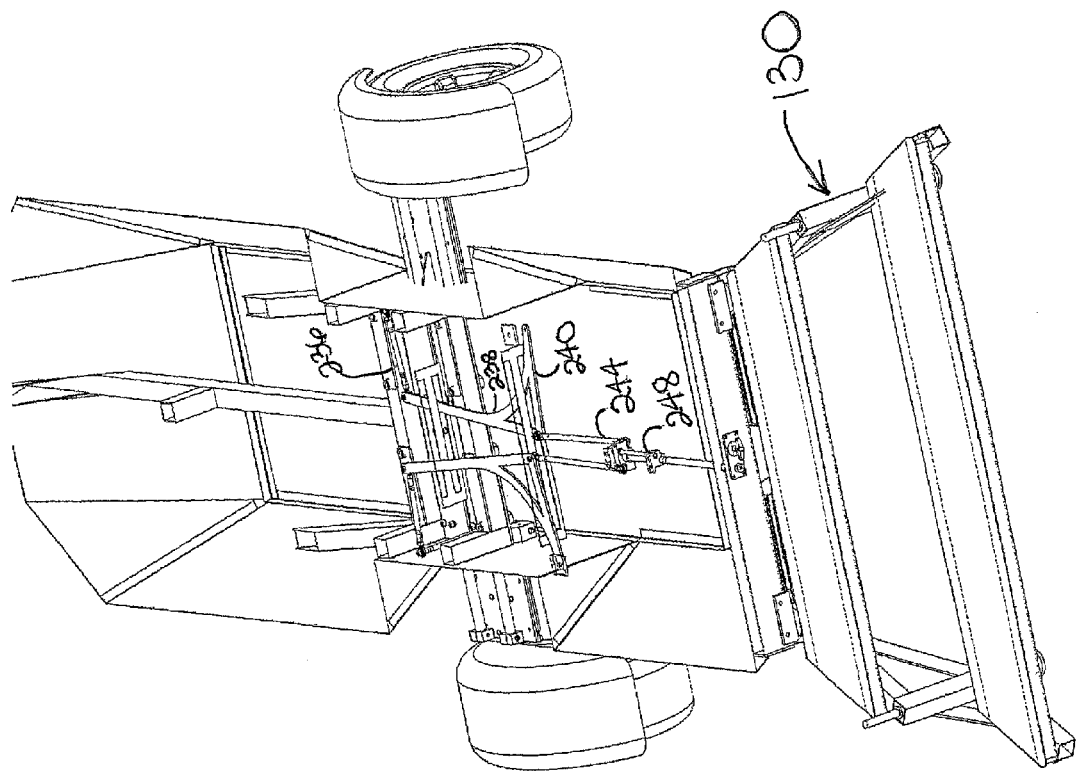

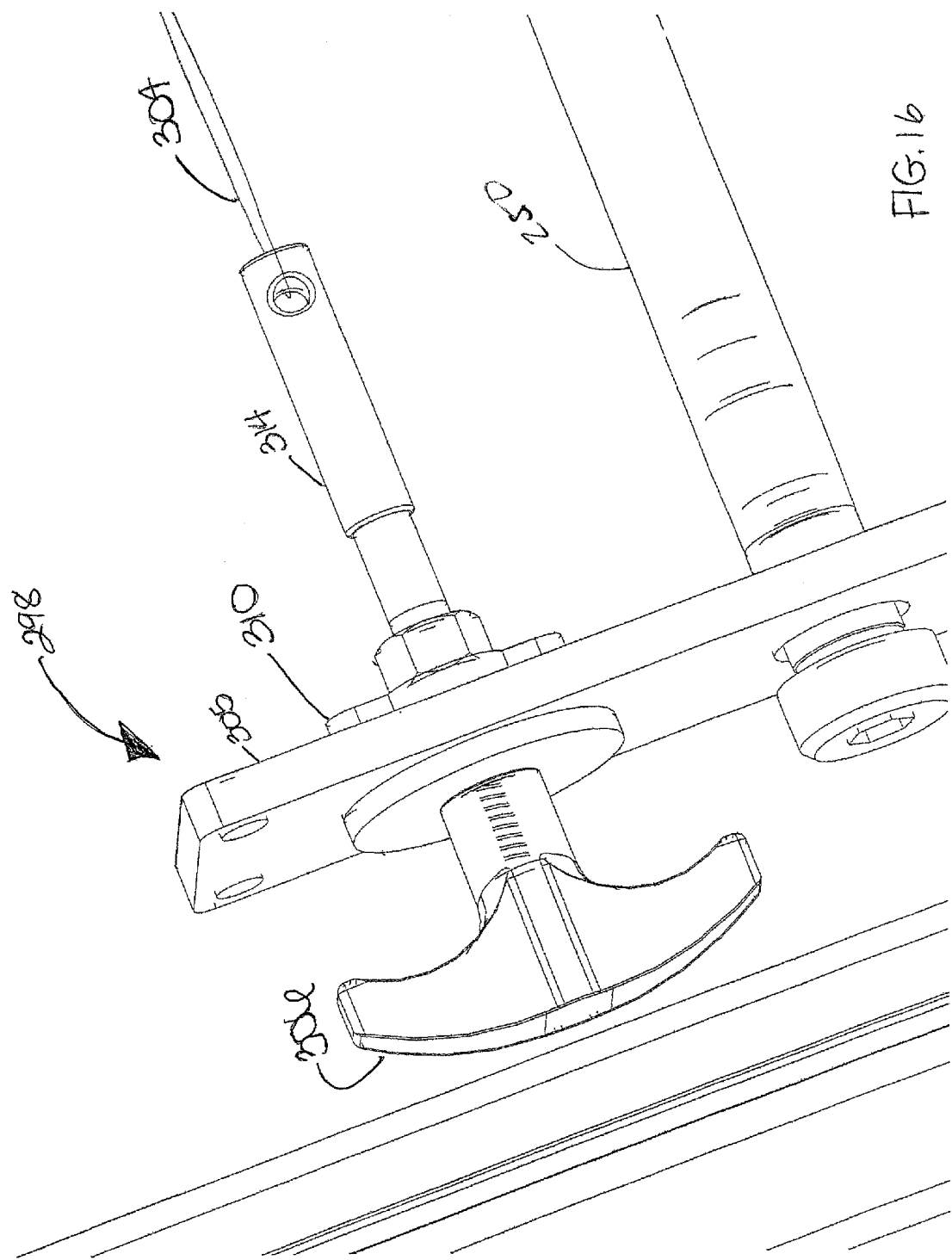

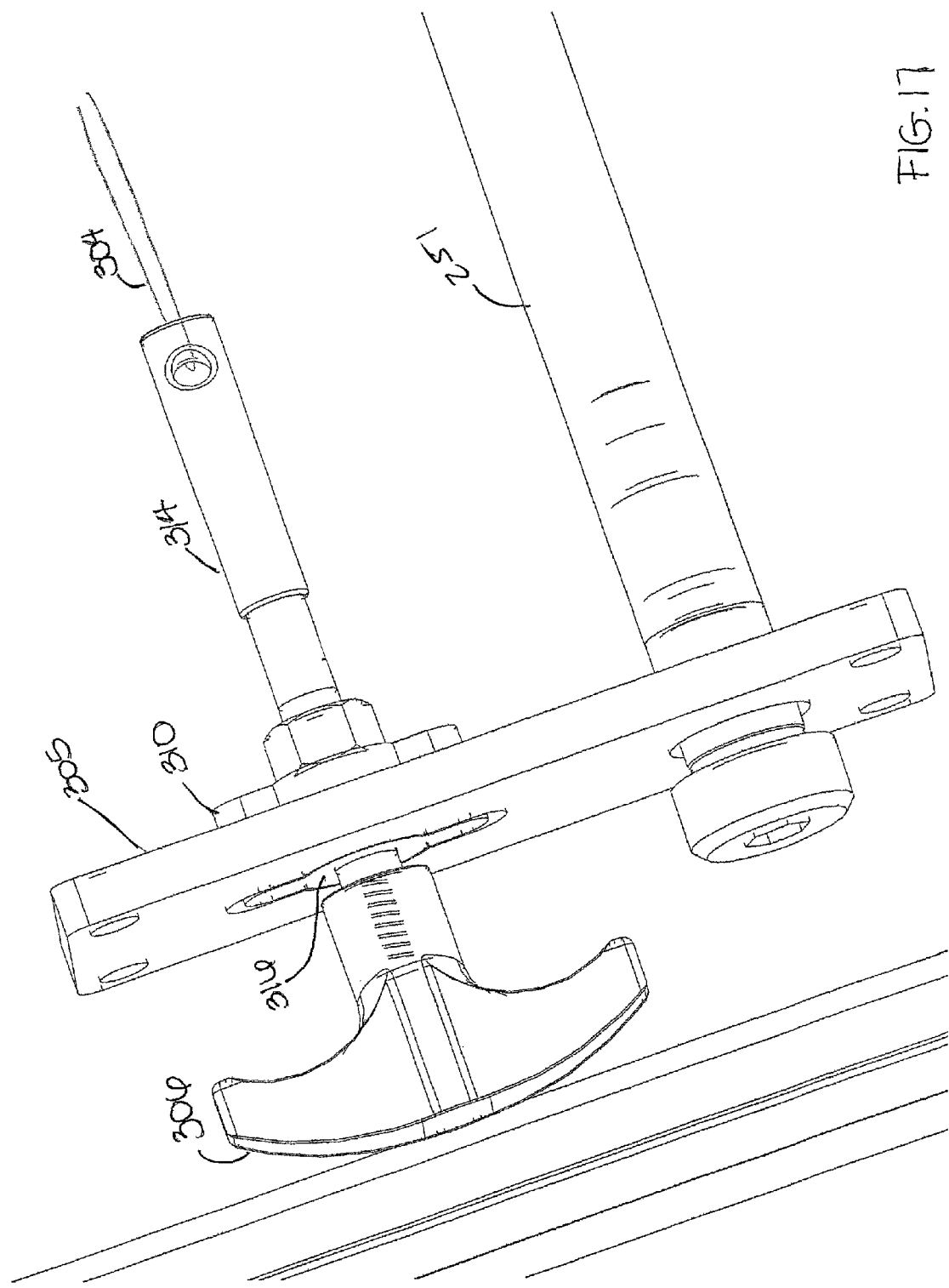

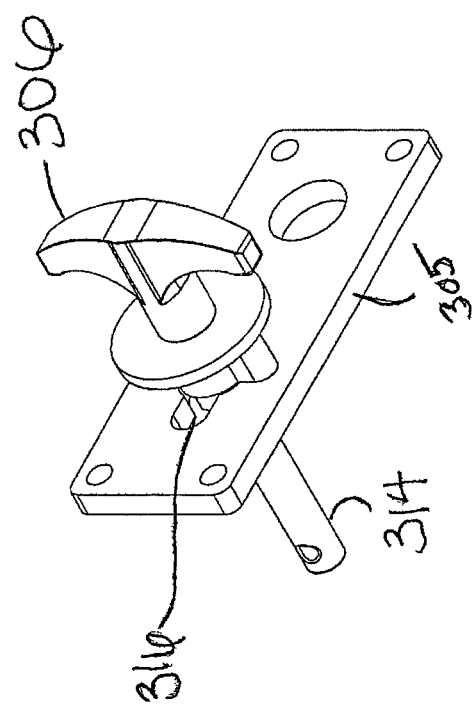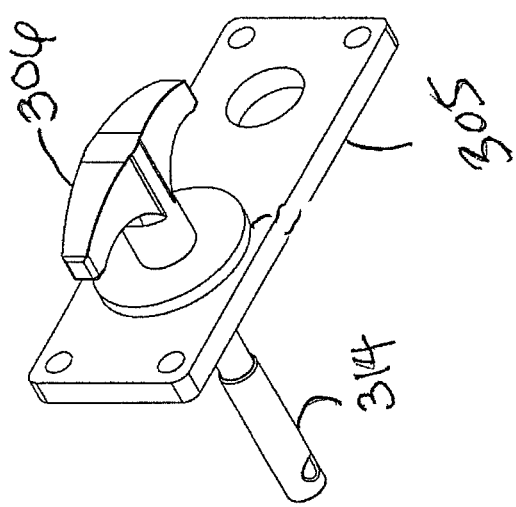
FIG. 18

FOLD-OUT TRAILER WITH RETRACTABLE WHEEL ASSEMBLY

CROSS-REFERENCE TO RELATED APPLICATION

The present application claims the benefit of U.S. Provisional Patent Application 61/555,292 filed Nov. 3, 2011, the content of which is hereby incorporated by reference in its entirety.

BACKGROUND

Trailers have been used for centuries. Covered wagons, perhaps a more modern form of trailers given the history, provided covered living space during travel. More recent times have rendered the "pop-up" or "fold-out" vehicle pulled trailer in which the trailer has a couple positions, a compacted travel position and an expanded use position. Each of these trailers is part of a long existing desire for expandable covered living space presented in a trailer form.

Co-extensive with the modern development of trailers has been the development of renewable and non-renewable energy sources. Early on, fuel consumption was relatively low and concern about over use was not prevalent. As fuel consumption rose and expense of fuel reached new levels, society became interested in being more energy efficient. This trend expanded into an awareness of the need to protect the environment from wasteful uses of fuel. Trailers large in travel profile are at odds with fuel efficiency. In addition, large trailers are difficult to store and transport.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

In one embodiment, the trailer includes a retractable wheel assembly that provides stability for the trailer and is configured to assist with preventing tipping of the trailer in high winds or due to improper loading, which often makes the trailer more top heavy. The retractable wheel assembly is configured to vary the space between a plurality of wheels in at least two positions. The plurality of wheels are used to maneuver the trailer by way of a guide assembly which retracts the wheels toward and away from one another. When the wheels are in a retracted position, the horizontal distance between each wheel is narrow, allowing the trailer to fit onto narrow routes, such as, for example, hiking trails. When the wheels are in an extended position, the horizontal distance between each wheel is wider than that of the retracted position. In this configuration, the trailer is better suited for pulled by a vehicle at higher speeds because the weight of the trailer is distributed farther laterally, thus resulting in sturdier trailer.

In another embodiment, the trailer includes at least a plurality of fabric support connections that retain a plurality of fabrics spaced apart from one another so as, if desired, to insulate the roof and side walls of the trailer. In another embodiment, the plurality of fabric support connections are connected by way of extrusions to some of the sides of the trailer and further provide insulation by forming a double wall on those sides. In another embodiment, the plurality of fabric support connections form a double wall only on certain portions of the top side of the trailer.

According to one embodiment, when the trailer is in a traveling configuration, space for storing items within the trailer is available. In the traveling configuration, the empty space areas inside the trailer is congregated and made accessible, thus avoiding the need to tie travel accessories to the outside of the vehicle or on top of the trailer, where such items will likely disturb the aerodynamics. In another embodiment, the trailer provides for additional storage space available through at least one access door that provides access to a storage compartment located below the floor of the trailer. The at least one storage compartment may be available in both the traveling and the camping configuration.

In yet a further embodiment, the fold-out trailer includes a ski assembly that allows the fold-out trailer to easily be moved across snow.

BRIEF DESCRIPTION OF THE DRAWINGS

FIG. 5 is a perspective sectional view of fabric support connections on a wall assembly.

FIG. 5A is a perspective sectional view of fabric support connections on a floor platform.

FIG. 7A is a perspective view of an upper portion of the trailer having a second embodiment for covering a flexible hinge.

FIG. 15A is a bottom plan view of the trailer.

FIG. 15C is a perspective view of the trailer with parts removed.

FIG. 16 is a perspective view of a lock assembly in a first position.

FIG. 17 is a perspective view of the lock assembly in a second position.

FIG. 18 is a perspective view of the lock assembly in a first and second position.

Figure 1:
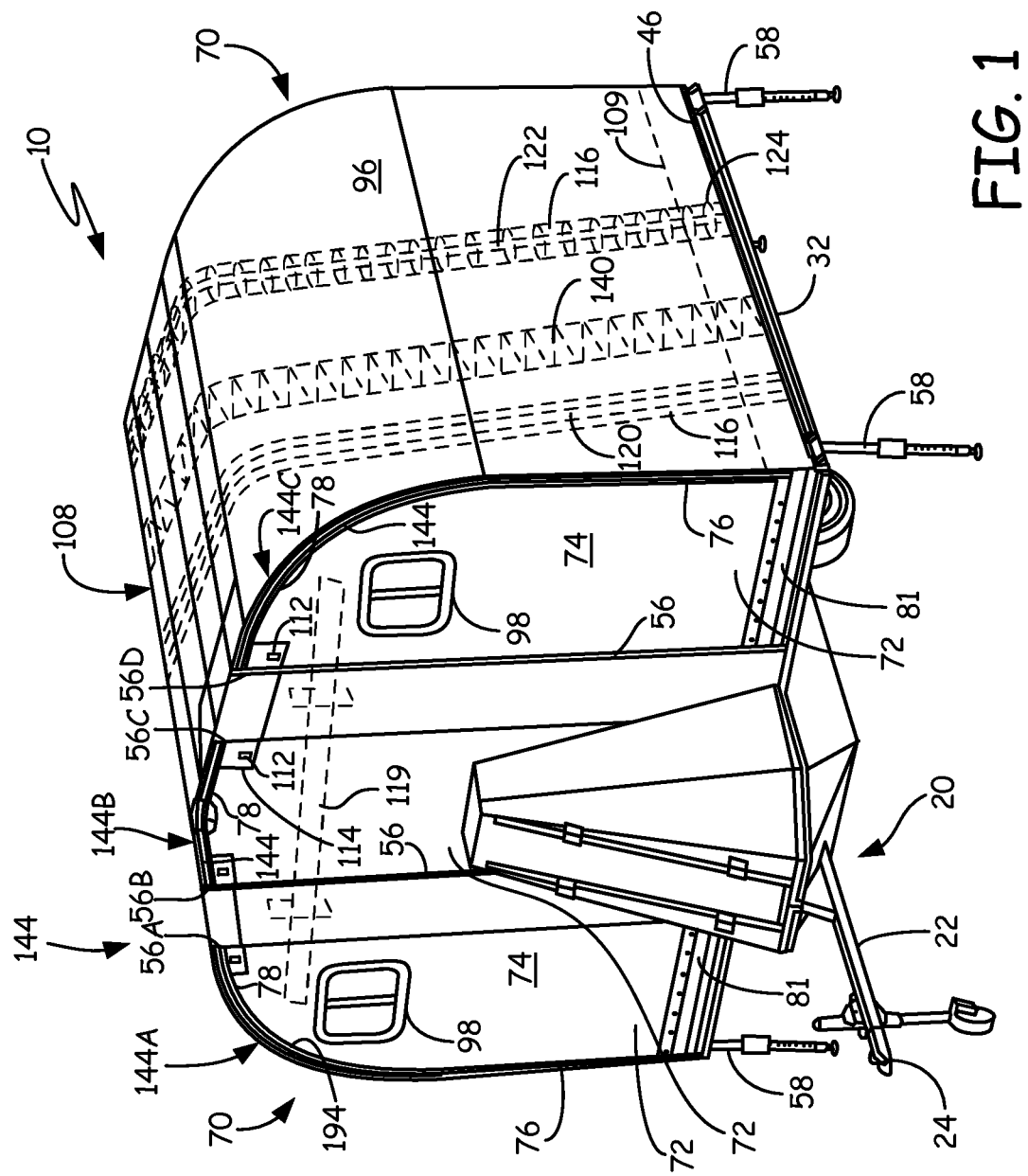
FIG. 1 is a front perspective view of the fold-out trailer showing the trailer in a fully-extended position.

The figures now have been shown and will be described in clear detail enabling one of ordinary skill to make and use the present invention. Modifications can be made without departing from the spirit and scope of the invention.

DETAILED DESCRIPTION OF ILLUSTRATIVE EMBODIMENTS

Aspects of the invention will be described with respect to fold-out trailer 10 illustrated, for example, in FIGS. 1, 2 and 8-12. However, it should be understood that trailer 10 is but one embodiment where aspects of the invention can be incorporated on other folding or expanding trailers, or on other forms of trailers that are not necessarily used for camping or even on equipment that is generally pulled by another vehicle or device.

The trailer 10 as shown in the figures and described herein has some features also present in the trailer described in U.S. Pat. No. 7,967,369, the content of which is hereby incorporated by reference in its entirety. In the exemplary embodiment illustrated, the trailer 10 includes a trailer frame 20, at least one primary folding platform 40, at least one wall assembly 70 and a retractable wheel assembly 200. These components cooperatively form a fold-out trailer 10 that has a small profile when folded that can be used on both narrow and wide paths. Additionally, the trailer 10 has a large covered living/storage area when in an expanded, camping position 14.

Figure 2:
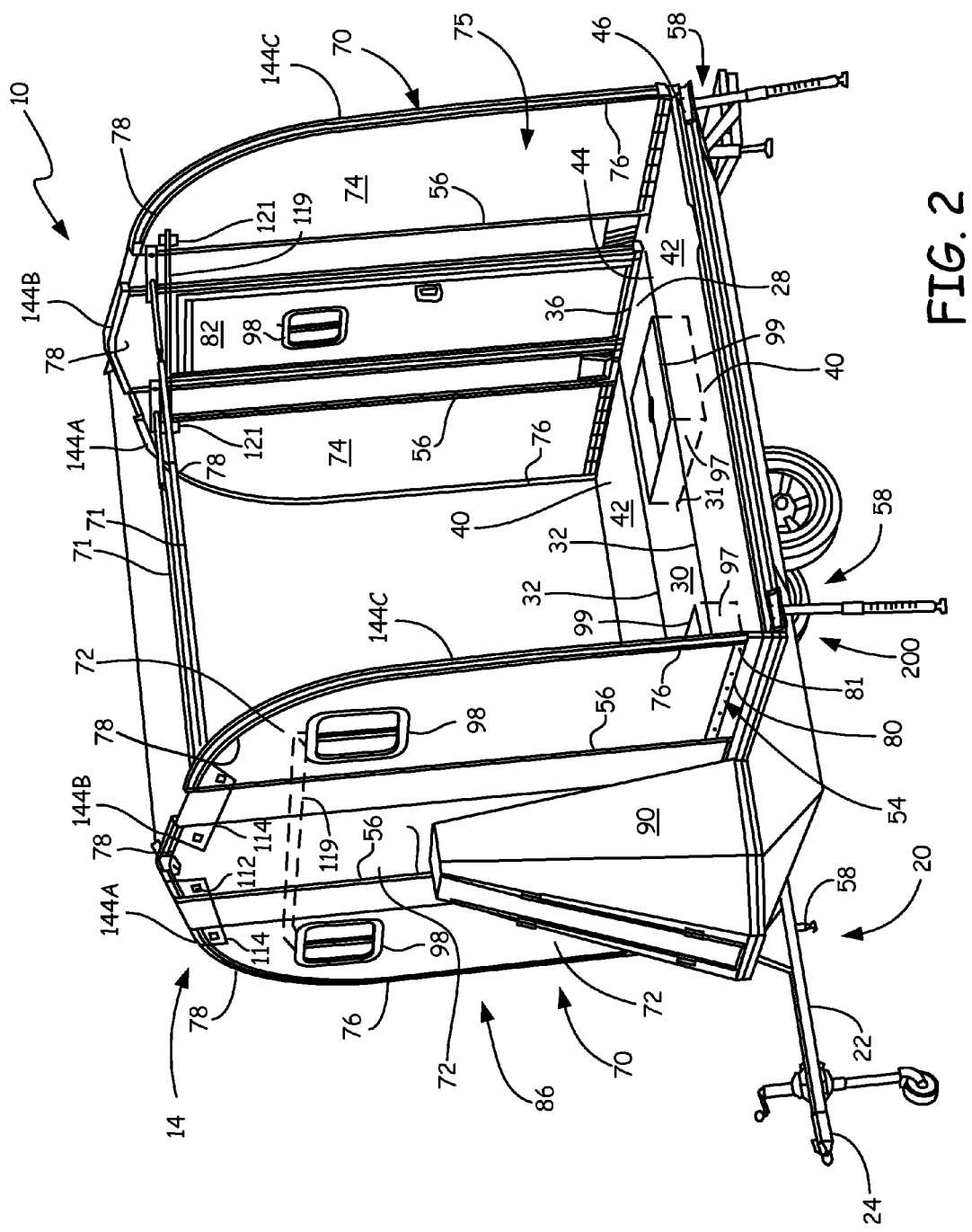
FIG. 2 is a rear perspective view of the fold-out trailer in a fully extended position showing the trailer with portions of the canopy removed for clarity.
Figure 4:
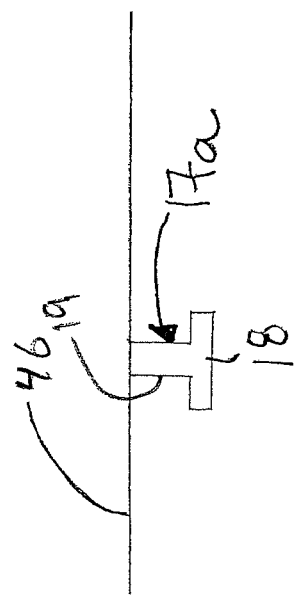
FIG. 4 is a schematic top view of the ground supports of FIG. 3.
Figure 3:
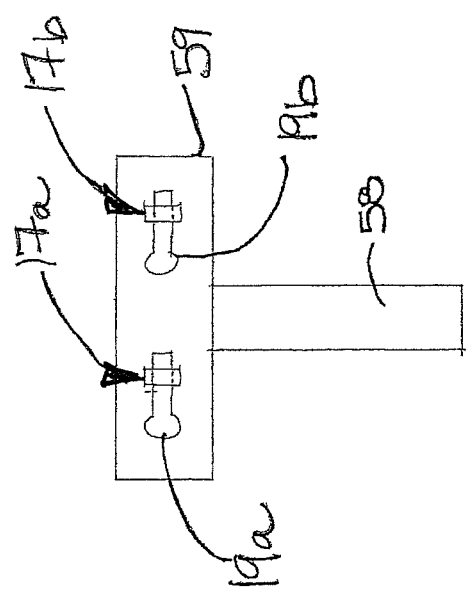
FIG. 3 is a schematic front elevational view of ground supports which are selectively engageable with a ground surface.

As illustrated in FIGS. 1 and 2, the trailer frame 20 can have a tongue 22 joined to a hitch 24. The hitch 24 can, in turn, be joined to a vehicle, such as a car or an all-terrain vehicle, or any other motor-powered object that is configured to receive the hitch 24 and pull the trailer 10. These components are of standard size, strength and materials as are found throughout the field of trailers. The tongue 22 is joined to a stationary platform 28, which can be of any material of suitable size and strength. The stationary platform 28 forms a portion of the floor when the trailer 10 is in the expanded, camping position 14. As such, the stationary platform 28 may be insulated or have a floor covering, such as carpet. The stationary platform 28 can also include one or several storage compartments 97 that are accessible through at least one access door 99. The access door 99 can be located below the floor of the trailer and/or on the side of the stationary platform. The stationary platform 28 has a major surface 30 defining a stationary plane 31, a plurality of side edges 32, a front edge and a back edge 36. The stationary platform 28 may be joined to and supported above an undercarriage 26. The trailer 10 includes at least one primary folding platform 40. The primary folding platform 40 has a major surface 42, an inside edge 44, an outside edge 46 to which ground supports 58 can be attached. In one embodiment as illustrated, there are two primary platforms 40. The inside edge 44 of the primary platform 40 is desirably joined to one side edge 32 of the stationary platform 28 via a hinge. Such hinge may be a stepped-up hinge, adding clearance for the wall assemblies 70. The ground supports 58, joined to the primary platform 40, are selectively engageable with a ground surface, e.g., dirt, sand, tar, gravel, etc. In an advantageous embodiment shown in FIGS. 3 and 4, ground supports 58 are removably attached to edge 46 by way of at least a plurality of projections 17a and 17b selectively engaging ground support plate 58. Projections 17a and 17b extend outwardly from the edge 46. Apertures 19a and 19b located in ground support plate 59 are configured with a first ends to receive enlarged heads 18 of projections 17a and 17b and extending slots of size only to accept support posts 19.

The primary platform 40 has a folded position 52 (FIG. 9) in which the plane of the platform 40 and stationary plane 31 are skewed planes, e.g., non-parallel or perpendicular. One skilled in the art can see how the angle of the platform 40 to the stationary platform 28 directly impacts any "top heavy" issues and trunk size issues. In the folded position, the primary folding platform 40 is used as an outer-most enclosure, enclosing some of the remaining components of the trailer, such as, for example, the secondary folding platform. The primary platform 40 has an extended position 54 (FIGS. 1 and 2) in which the platforms 40 and stationary platform 28 are co-planar. That is, the primary platform 40 forms a portion of the floor and as such may be insulated or have floor coverings including carpet as desired. In one embodiment, two primary platforms 40 are provided, one folding on each side of the trailer 10.

Referring back to FIGS. 1 and 2, the trailer 10 also includes at least one wall assembly 70 which may have at least one segment 72 and perhaps windows 98. In one embodiment there are two wall assemblies 70 and three wall segments 72 per wall assembly 70. The wall assemblies 70 form rigid sides to the fold-out trailer 10 when in an extended position 14. Each wall segment 72 has a major surface 74 defining a segment plane 75, side edges 76, a top edge 78 and a bottom edge 80. Side edges 76 of adjacent wall segments 72 are preferably joined via a hinge 56. Bottom edges 80 of each wall segment 72 are preferably joined to one of the stationary platform 28 and the primary platform 40 via a hinge 81, which may be a stepped up hinge as needed. Each wall assembly 70 desirably has an extended position 86 in which the assembly is perpendicular to both the stationary platform 28 and the primary platforms 40 and a folded position in which the segments 72 are each parallel to one of the primary platforms 40 and the stationary platform 28. One or more of the wall assemblies 70 may have a door 82 for human ingress and egress.

Referring again to FIGS. 1 and 2, when the wall assemblies 70 are in an extended position 86, a canopy 96 extends therebetween so as to provide a roof and/or walls, being secured to the wall segments 72. The canopy 96 may further be secured to the primary platform 40. While the canopy 96 may be attached when the wall assemblies 70 are in the folded position 84, such is not necessary. Struts 71 or other support structure extending between the wall assemblies 70 may be used to add structural support to the canopy 96 in the extended position. In one embodiment, the canopy 96 is of a tent awning or marine grade fabric known in the art, such as, but not limited to, nylon and/or canvas. The fabric can be made of a variety of suitable materials. For example, some fabric characteristics can include puncture-resistant, mildew-resistant and mold-resistant. The fabric can also include properties so as to have ultra-violet protection.

In an advantageous embodiment, the canopy 96 comprises an outer fabric layer 96a and an inner fabric layer 96b, each of which are fixedly connected to the wall assemblies 70 from when the wall assemblies 70 are in the folded transport configuration of the trailer 10 to the extended configuration where the wall assemblies 70 are oriented perpendicular to the platforms 40. As illustrated in FIG. 5, trailer 10 can also include a plurality of fabric support connections 100a and 100b for outer fabric layer 96a and inner fabric layer 96b, respectively. The fabric support connections 100a and 100b extend along the edges 76 and 78 of each wall assembly 70 and extend along the edges 46 of the primary platforms 40. The fabric support connections 100a and 100b are spaced apart from each other so as to hold fabrics 96a and 96b away from each other in the extended position 86 of the trailer 10 so as to trap air therebetween and thereby provide an insulated roof and side walls.

In the embodiment illustrated in FIG. 5, the fabric support connections 100a, 100b comprise an enlarged lateral edge 142 on each of the edges of the fabrics 96a, 96b that is disposed in elongated slotted channels 143a, 143b such that the fabric 96a, 96b extends out of the slot of the slotted channels 143a, 143b. The slotted channels 143a, 143b can be integrally formed together from a single unitary body such as from a single extrusion 144. In the embodiment illustrated for the wall assemblies, the extrusion 144 is L-shaped where slotted channel 143a for the outer fabric 96A is disposed along the outer edge of the wall segments 72 and a support portion 145a of the extrusion 144 covers the outer edge of the wall segments 72 of the wall assemblies 70, while a support portion 145b of the extrusion 144 supports the slotted channel 143b for the inner fabric 96b, which is disposed on inwardly facing surfaces of the wall segments 72 of the wall assemblies 70. In another embodiment, the elongated slotted channels 143a and 143b are not integral (i.e., formed of a single unitary body) but rather are separate pieces connected, if desired, by way of a fastener (herein a plurality of pins 115 attached to the wall segments 72).

As illustrated in FIG. 5A, slotted channels 153 along the edge 46 for the fabrics 96a, 96b are substantially similar to the slotted channels 143 disposed on edges 76, 78 in that they are spaced apart from each other and have slots, herein opening upwardly, with portions of the fabrics 96a, 96b extending therethrough, while enlarged end portions 152 are retained therein. As with the slotted channels 143 disposed on edges 76, 78 the slotted channels 153 disposed along edges 46 can be separate parts (as illustrated) secured to edges 46 of each of the platforms 40 or integrally formed from a single unitary body.

At this point it should be noted the enlarged ends 142 of the fabrics 96a, 96b inserted in the slotted channels 143a, 143b can be formed for example from fabric tubing or awning rope, such as sold by Keder of Shenzhen, China.

In the illustrated embodiment in FIG. 1, side extrusion 144 does not extend continuously along edges 76 and 78, but rather comprises three sections. A first section 144A of the side extrusion 144 starts at one of the side edges 76 of the wall assembly 70 and extends longitudinally through the top edge 78 of the wall assembly 70 until it encounters a first end 56a of the hinge 56. A second extrusion section 144B of the side extrusion 144 begins at a second end 56b of the hinge 56 and curves around to a first end 56c of a different hinge 56. A third section 144C of the side extrusion 144 starts at a second end 56d of the second hinge 56 and slightly curves at top edge 78 and extends downwardly alongside edge 76. In other words, extrusion 144B is disposed along the upper edge of the middle wall segment 72 of each of the wall assemblies 70, while extrusions 144A and 144C are disposed along the edges of the side wall segments 72 of each of the wall assemblies 70.

In one embodiment as illustrated in FIG. 1, the inner fabric 96b and/or the outer fabric 96a is made out of or can include stretchable material 140, such as, for example, a band. The stretchable material 140, shown in FIG. 1, can extend throughout the whole inner fabric 96b, or it can be just in a section of the inner fabric 96b. This will prevent straining the two fabrics 96a, 96b as the wall assemblies 70 are raised and separated so as to form the enclosure. In one embodiment, the material of the inner fabric 96b may be different than the material of the outer fabric 96a. For example, the inner fabric 96b may be lightweight and allow moisture to transfer through it. In another configuration as mentioned above, both the inner fabric 96b and the outer fabric 96a can trap air inside for insulation, yet still allow for moisture to travel through.

Figure 6:
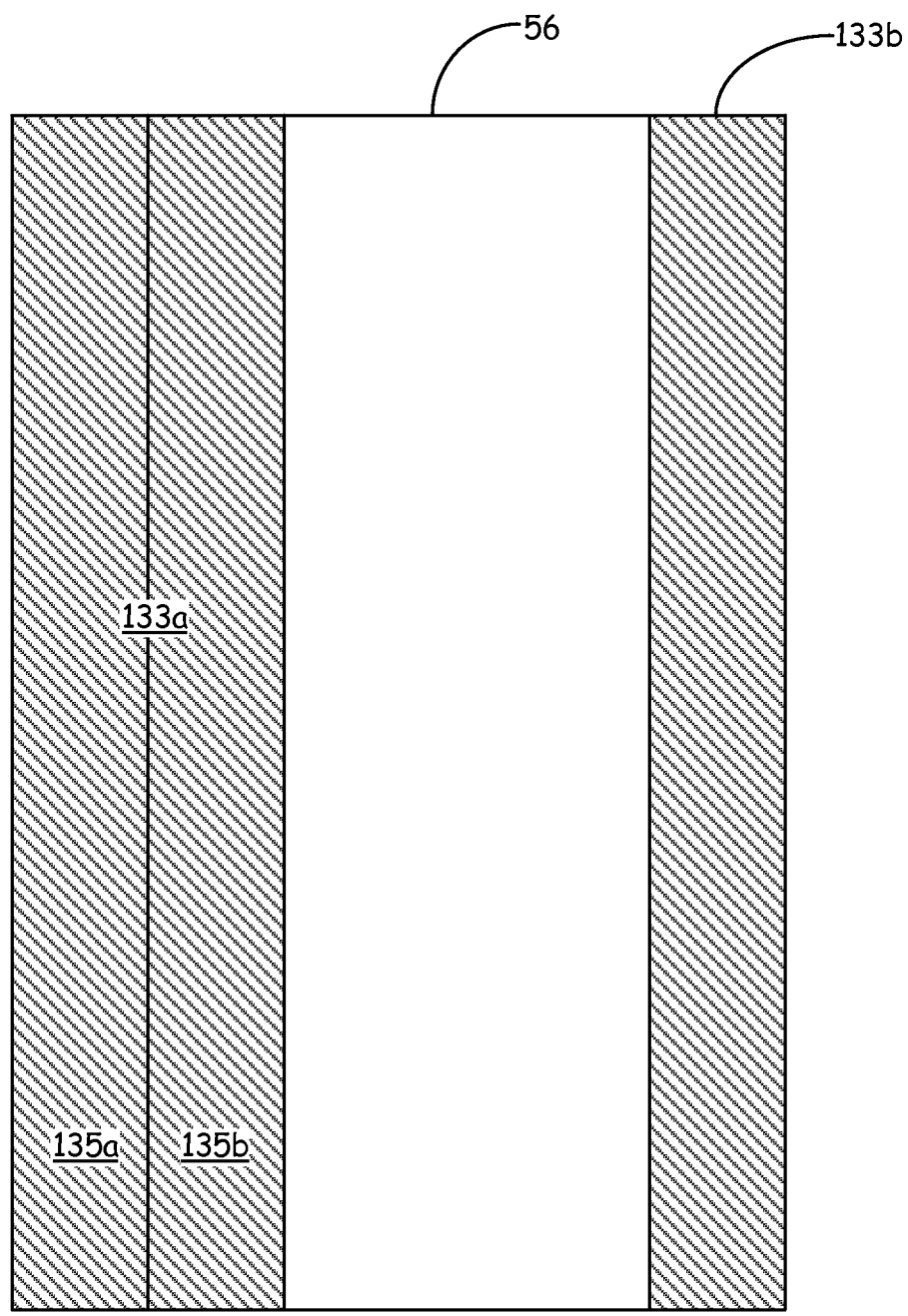
FIG. 6 is sectional view of the layers of at least two fabric panels made out of two or more layers for forming a hinge.

In one embodiment as illustrated in FIG. 6, hinges 56 are made out of at least two flexible (e.g. fabric) panels 133a and 133b. In an advantageous embodiment, one or more of the at least two flexible panels are made out of two or more layers 135a and 135b. The layers 135a, 135b can be sewn, bonded or otherwise joined together.

Figure 7:
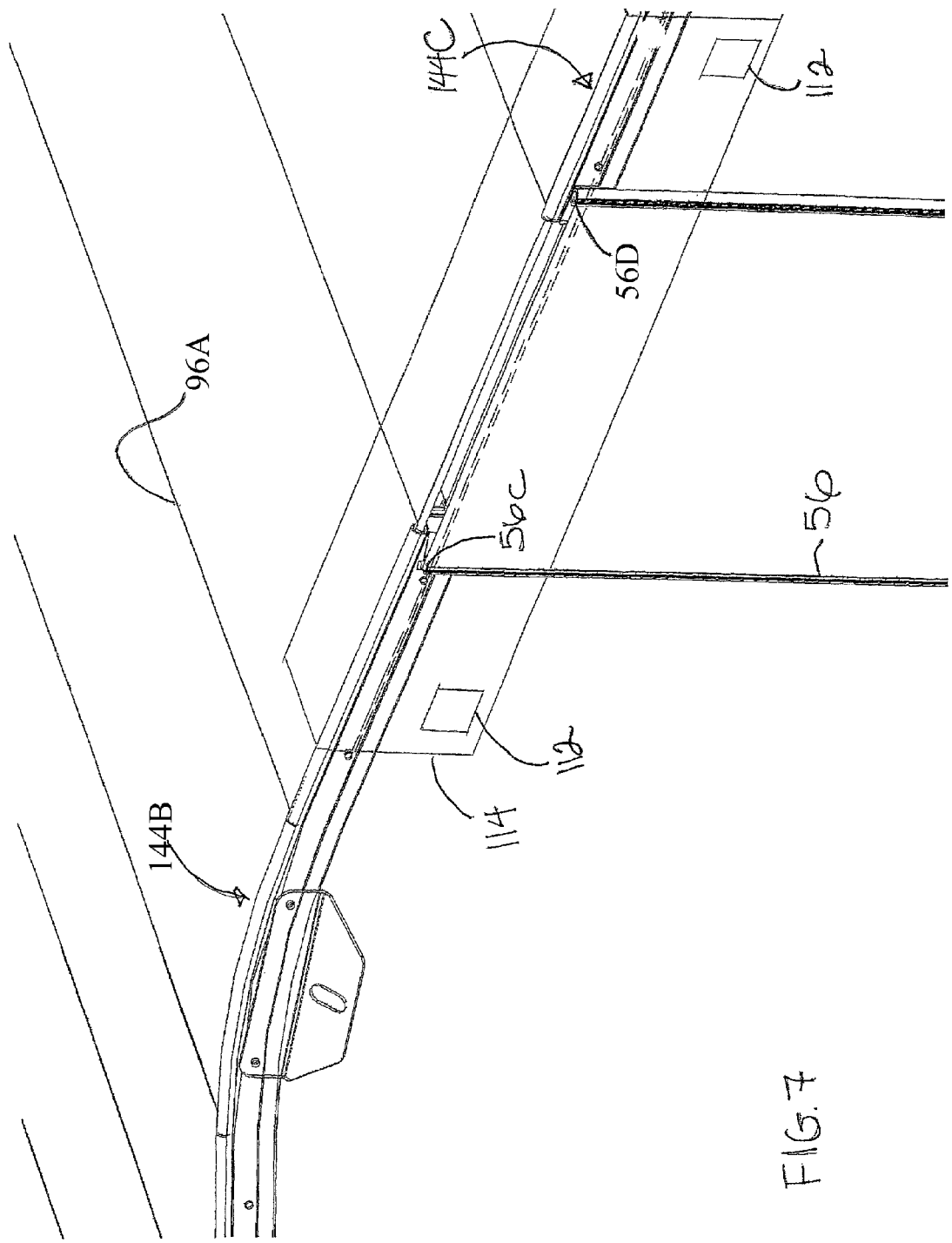
FIG. 7 is a perspective view of an upper portion of the trailer having a first embodiment for covering a flexible hinge.

In another embodiment illustrated in FIGS. 1, 7 and 7A, flaps or covers 114, 114A are provided so as to cover the hinges 56 where the fabric connections 100A, 100B on the wall segments 72 are separated from each other (because of the hinges 56 between the wall segments 72). The covers or flaps 114 help seal any open gaps that may exist between the ends of the fabric connections 100A, 100B (herein extrusions 144A-144C). Portions of the covers or flaps 114 can be secured to the fabric 96a and/or hinge 56 such as by bonding or sewing. If desired one end of the covers or flaps 114, 114A can be loose and after configuration of the trailer in the extended position, then the loose portion can be secured to the fabric 96a or wall segment. In FIG. 7, cover 114 is secured to the fabric 96A, while a loose portion can be removably secured to the wall segments 72 with suitable fasteners such as snaps, hook-and-loop fasteners and/or elastic bungee cords. In FIG. 7A, the cover 114A is formed from material of the hinge 56 and extends over an upper portion of the hinge 56 and is secured, in this embodiment non-removably, to the fabric 96a. As described above, covers 114 and 114A can be separate elements or formed integrally as a single unitary body from fabric 96a or the material forming hinge 56.

In one embodiment shown in FIG. 1, one or more receivers 116 can be provided on the enclosure 108 such as provided on the outer fabric 96a that runs all the way around the top panel 108 and accepts a segmented rod 120, as typically found with outdoor tents. For instance, there can be two such receivers. In one embodiment, a segmented rod 122 that snaps together can be inserted in the receivers 116 to help hold the enclosure 108 upright and prevent sagging of the fabric 96a. The receiver 116 can comprise one or more pockets, as illustrated, and/or spaced apart loops 124.

In one embodiment, trailer 10 includes a rigid panel 109, as shown in FIG. 1. Rigid panel 109 extends above the inside edges 44 of the primary folding platform 40 and connects the inside edges 44 with the fabric support connections 100. The rigid panel 109 ensures that if pressure were applied (i.e., by way of a human shoe or large item) against the sides of the fold-out trailer in the expanded position, the applied pressure will not rip the fabric.

Figure 8:
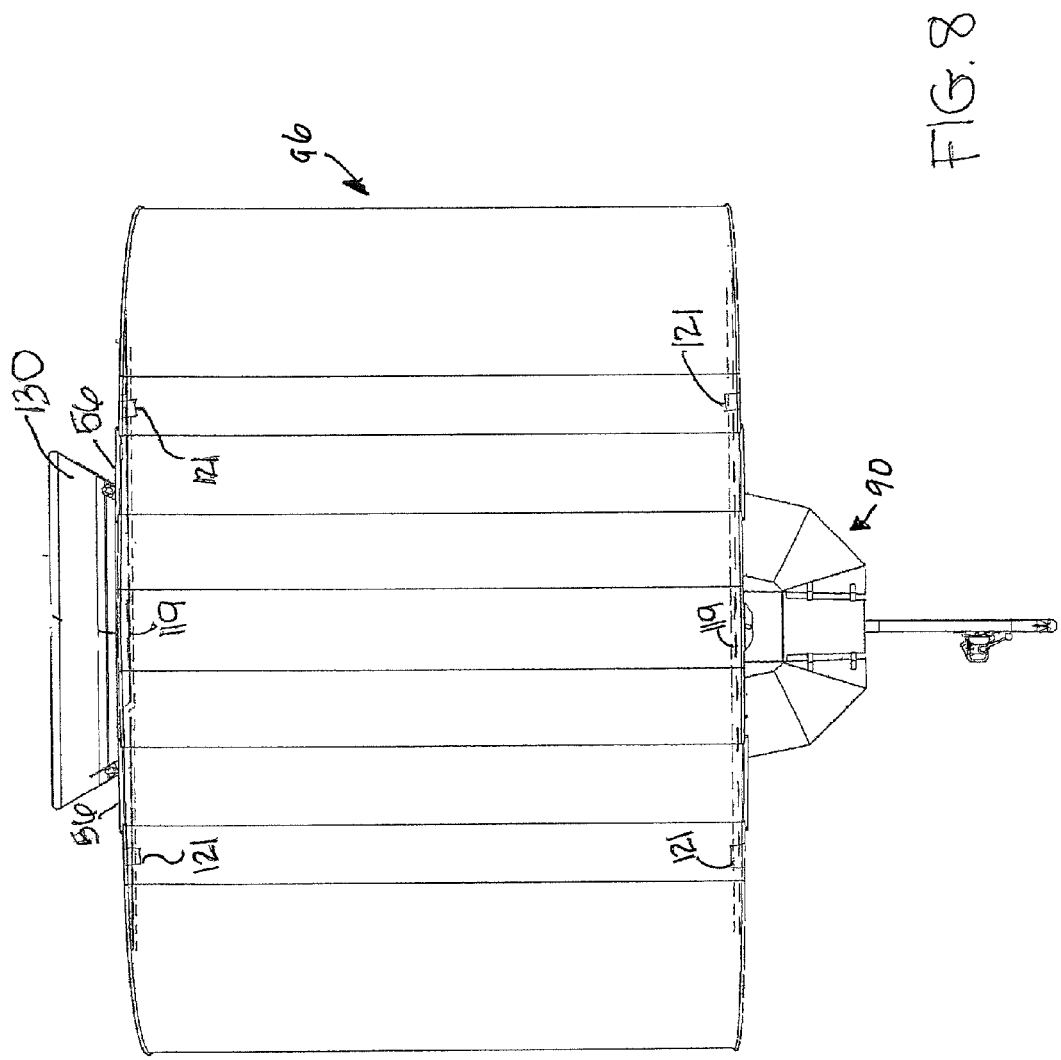
FIG. 8 is a top plan view of the trailer in the extended position.

In one embodiment shown in FIGS. 1 and 8, a hooked fastener inside the trailer 10 can be used to create a panel board 119 so that the wall segments 72 and the hinges 56 will no longer be independent, but will be tied together as a single wall structure for extra support. In one embodiment, panel board 119 is held in place by way of at least a plurality of supports 121.

Figure 9:
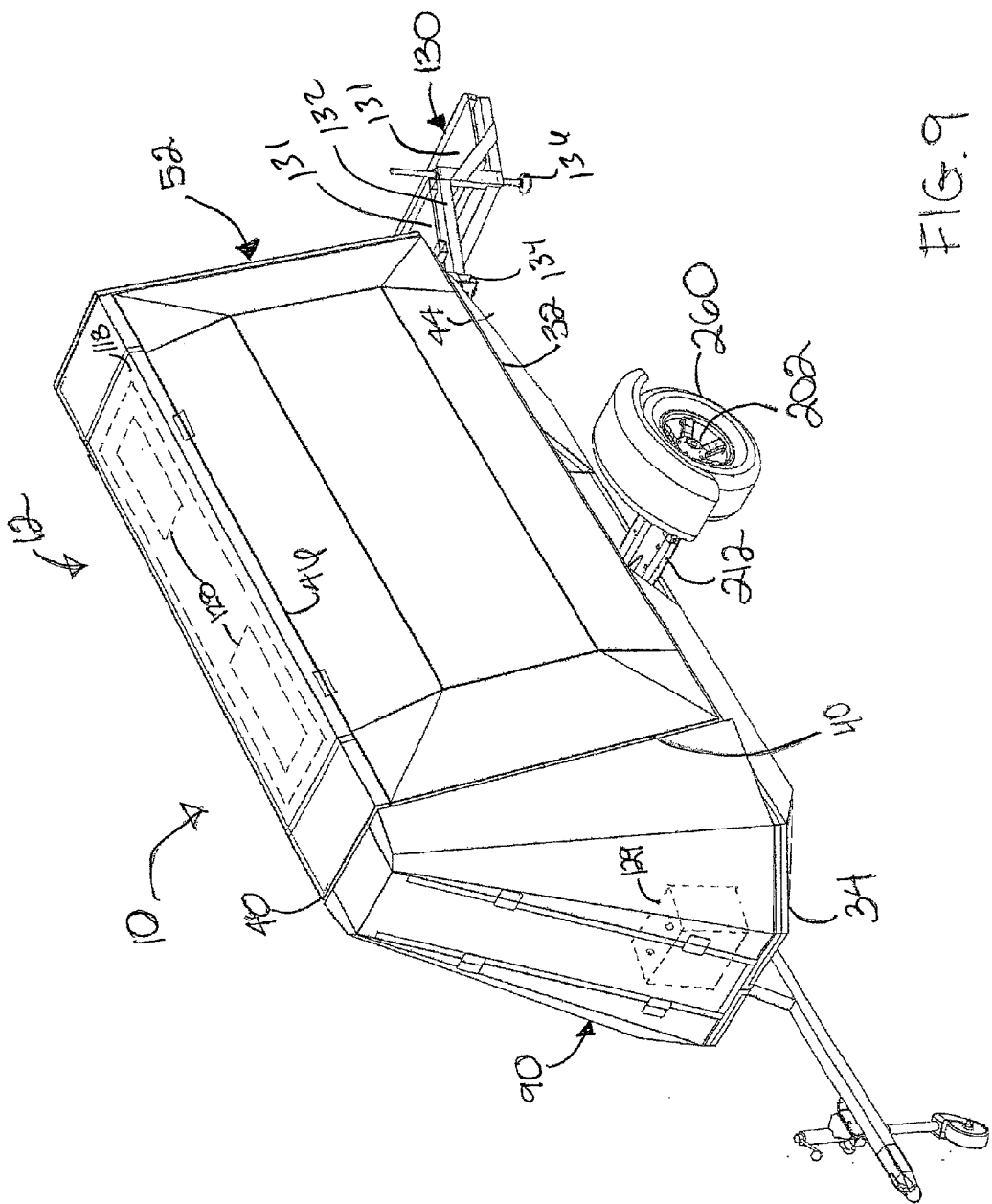
FIG. 9 is a perspective view of the trailer in a mostly folded traveling position with a step assembly installed.

In the embodiment shown in FIG. 9, the trailer 10 includes solar panels 128 underneath the cover of the top panel 118 on the inward facing side of the trailer 10. The top panel 118 may be removable. That is, the top panel 118 may be wholly or partially removable. In an advantageous embodiment, the solar panels 128 are operably connected to a battery 129 in order to store the energy obtained by the solar panels 128 for use, for example, during the night. If desired, the solar panels 128 can be arranged to work even when the trailer 10 is in the traveling or folded position 12.

The front cover 90 may be positioned adjacent to the tongue 22. The front cover 90 provides an initial wind engaging surface when traveling with the trailer in the folded position 12 and therefore is intended to have an aerodynamic exterior shape. The cover 90 further defines an area for storage, which may include items such as propane tanks. The front cover 90 may engage the stationary platform 28 and primary platforms 40 when the primary platforms 40 are in a folded position 52 as illustrated in FIG. 9. Structure of the front cover 90 may engage the stationary platform 28 and may be removably joined to the wall assembly 70 when the wall assembly 70 is in the extended position 86. In either engagement scenario, an area for storage is defined therein.

A back cover, not shown, engages the stationary platform 28 and is engageable with the primary platforms 40 when the primary platforms 40 are in the folded position 52. The back cover helps maintain any contents inside the trailer 10 when the primary platforms 40 are in the folded position and further can inhibit suction within the trailer 10 during travel. The back cover may be hinged or otherwise arranged to engage the stationary platform 28 and a ground surface, such as sand, dirt, water, gravel, vegetation, etc., when the back cover is in an extended position. The back cover may be shaped as a ramp for easy loading and unloading of the trailer. Alternatively, the back cover may provide steps to climb into the trailer 10.

Figure 10:
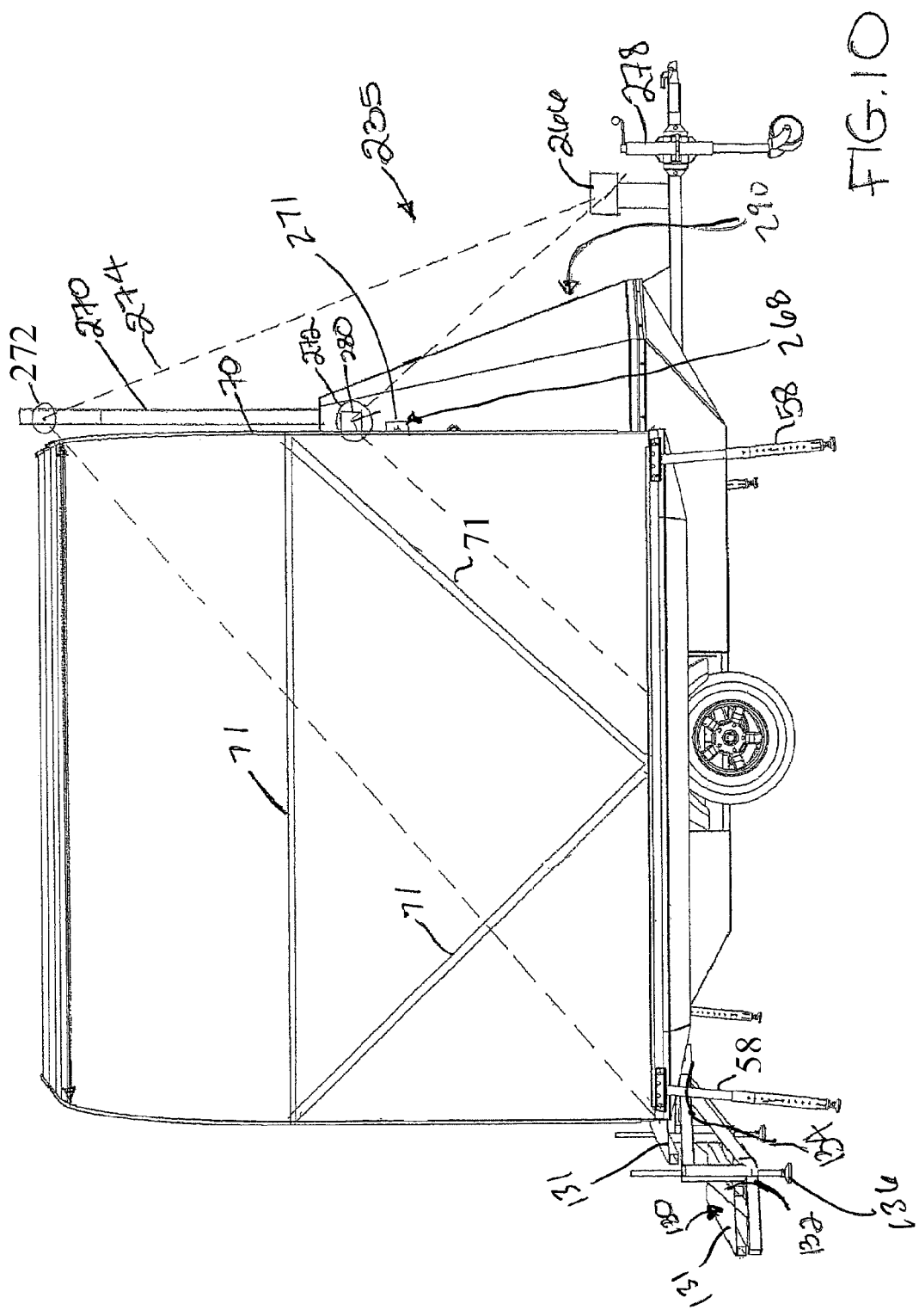
FIG. 10 is a side elevational view of the trailer in the extended position.

In an advantageous embodiment shown in FIGS. 9 and 10, the trailer 10 includes steps 130 for entering and exiting the trailer 10 through the door 82. The steps 130 comprise L-shaped brackets 132 that slide into corresponding receivers 134. The brackets 132 are skewed outwardly in order to provide stability. The steps 130 can also utilize an adjustable support 136 that extends downwardly. Panels 131 are removably joined to the brackets 132 to form the steps 130.

Referring to FIG. 10, a winch assembly 235 is provided to lift and lower a wall assembly 70, herein the front wall assembly. The winch assembly 235 includes a winch 266, an optional pulley 272 and lift cable 274 attached at a remote end to the wall assembly 70. FIG. 10 illustrates two winch configurations. In a first exemplary configuration, the pulley 272 is mounted in a lower position 280, while in a second exemplary configuration the winch assembly 235 includes a mast 270 to support the pulley 272 at a higher location to increase leverage. The winch 266 can be an electric or manual winch. In an alternative embodiment, the winch 266 can be located at position 280.

The winch assembly 235 can also include and a mast 270 with a deployable pulley 272 so that a larger angle is created with cable 274 to lift the wall assembly 70. Supports 71 can be provided inside (or outside) to support the wall assembly 70 in the vertical position. Such supports 71 can be located along the roof (FIG. 2) and/or along side(s) of the trailer 10 (FIG. 10).

A latch 268 can also be used to hold the wall assembly 70 vertically in the extended position. The latch 268 can take any number of forms. For instance, the latch 268 can comprise a plate 271 secured to the wall assembly 70 so as to raise and lower with the wall assembly 70. The plate 271 can include an aperture. When the wall assembly 70 is in the upright position of FIG. 10, the aperture would be disposed proximate a fixed, support structure (for example a portion of front cover 290) such that a pin disposed in the aperture also engages the fixed support structure so as to inhibit movement of the plate 271 away from the fixed support structure.

Figure 11:
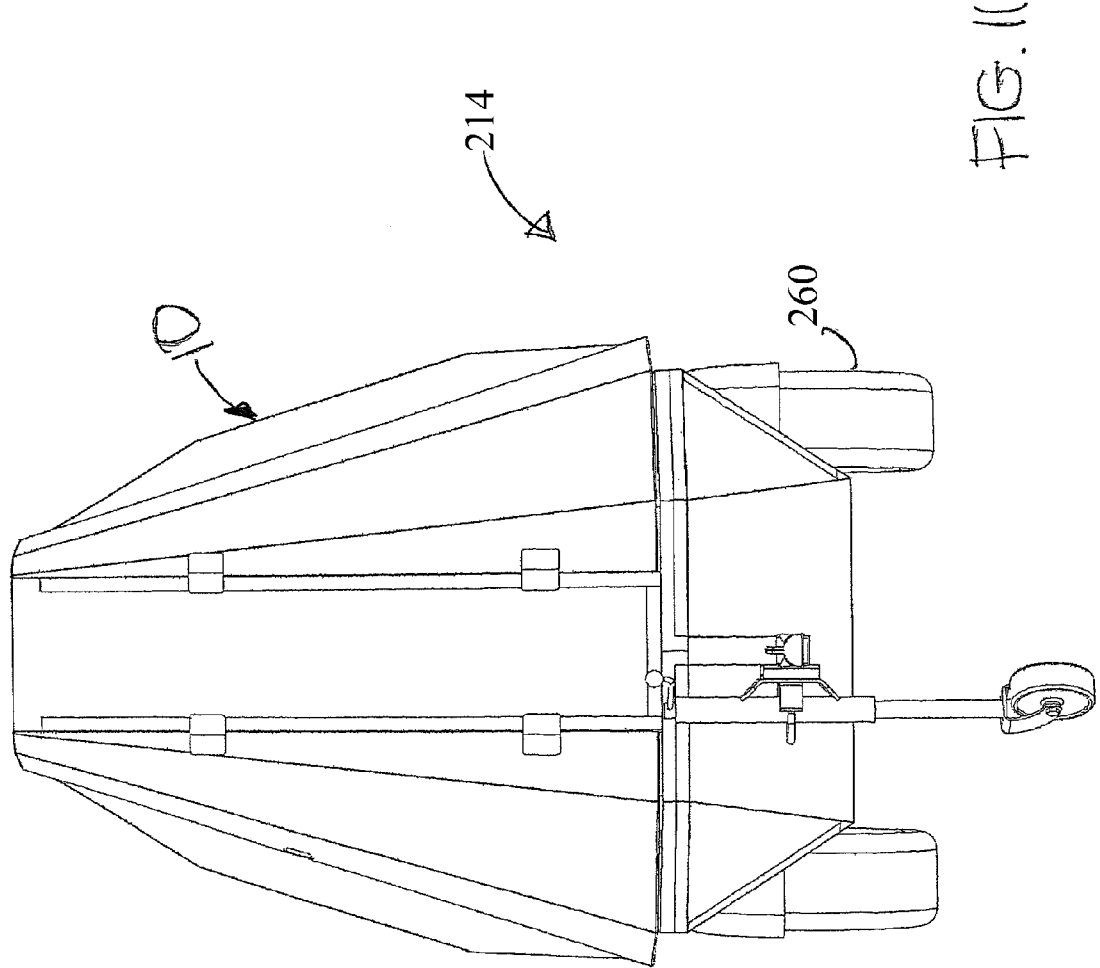
FIG. 11 is front elevational view of the trailer in the traveling position and the tire and wheel assemblies retracted.
Figure 12:
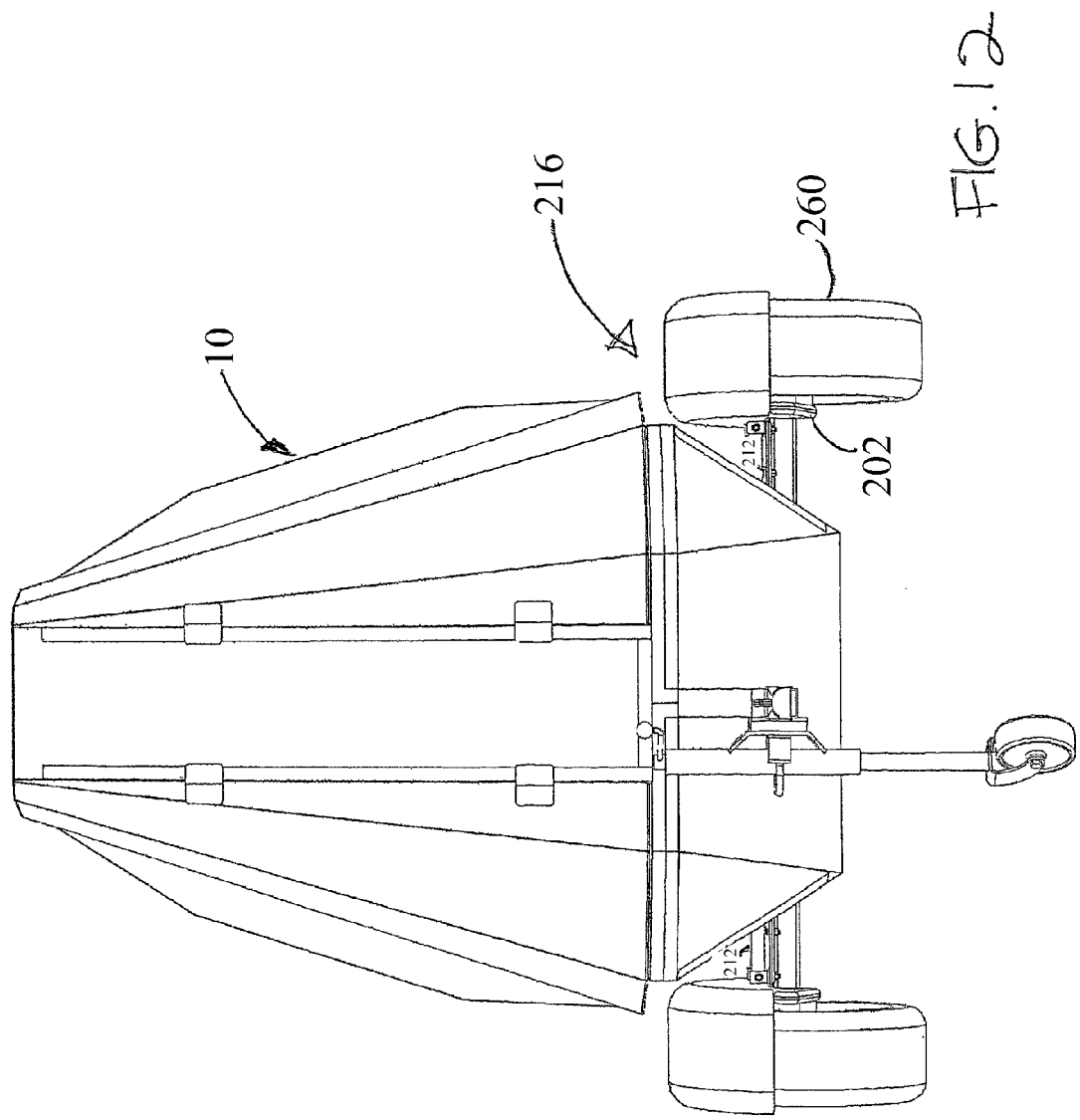
FIG. 12 is a front elevational view of the trailer in the traveling position and the tire and wheel assemblies extended.
Figure 13:
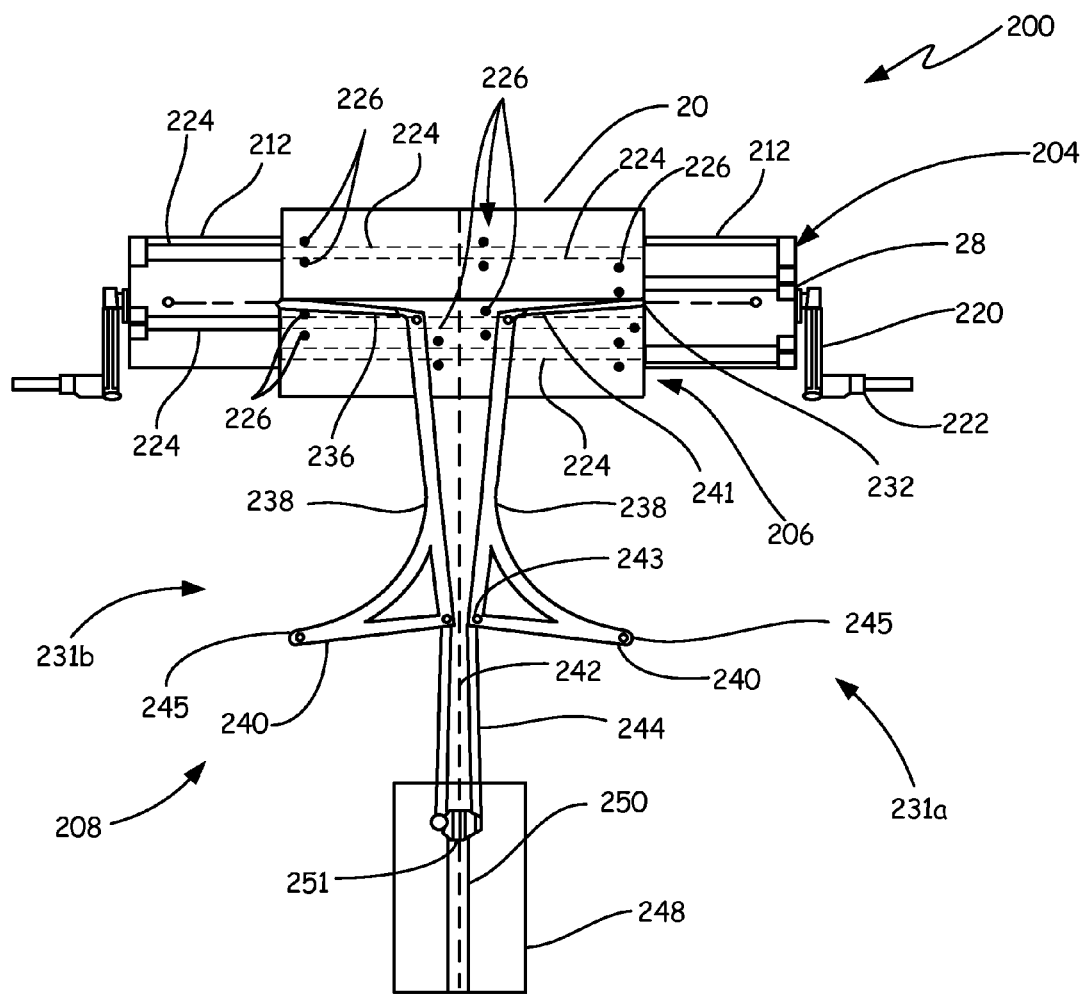
FIG. 13 is a schematic illustration of a first embodiment of a retractable wheel assembly.
Figure 14:
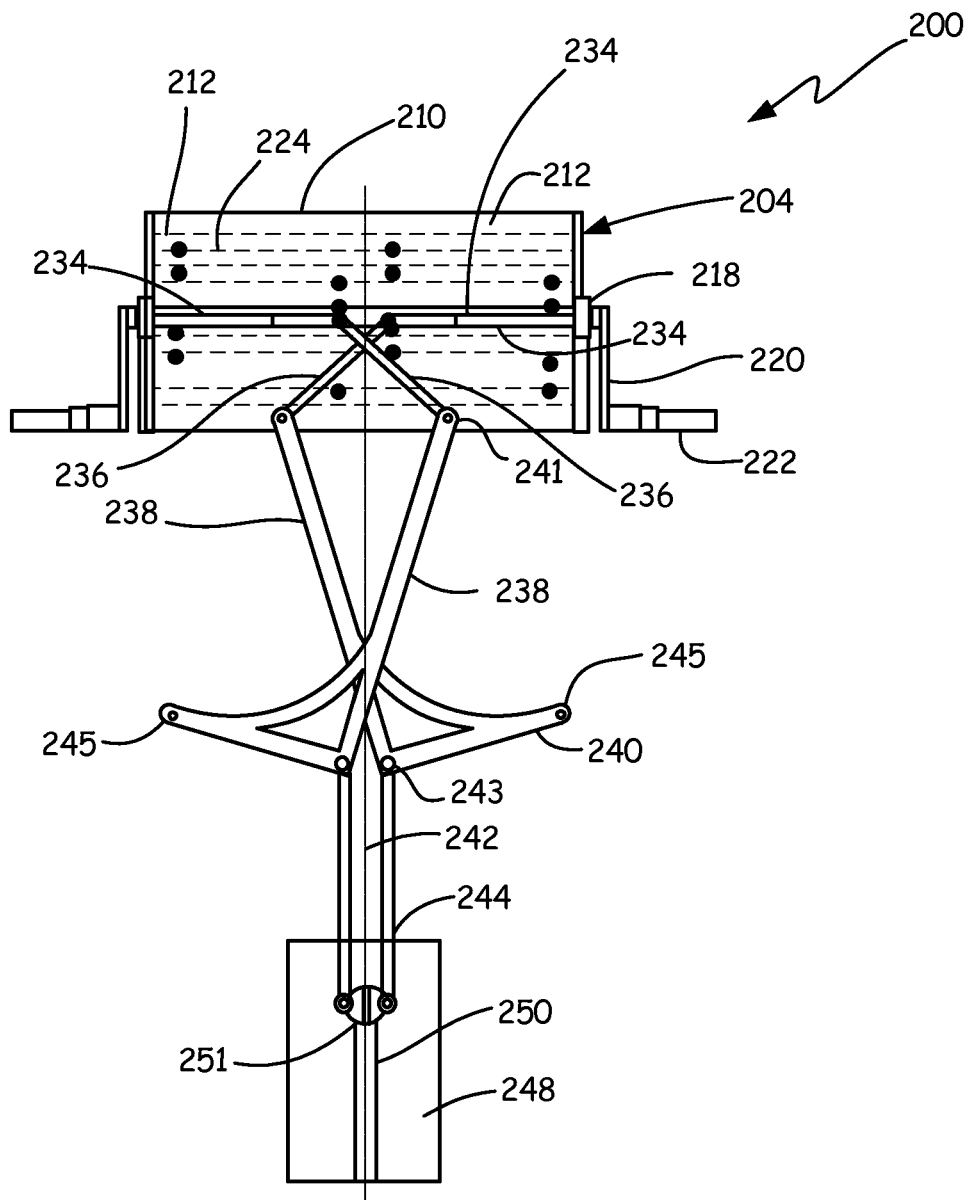
FIG. 14 is a schematic illustration of the retractable wheel assembly of FIG. 13 in an alternative position.

In one embodiment shown in FIGS. 11 and 12, another aspect further comprises a retractable or adjustable wheel assembly 200 that varies the spacing between a plurality of wheels 202 used to maneuver the trailer 10. Schematic illustrations of a first embodiment of the retractable wheel assembly 200A are shown in FIGS. 13 and 14. The retractable wheel assembly 200A includes a support assembly 204, a guide assembly 206 and a link assembly 208. The support assembly 204 has a support base 210 rigidly connected to the frame of the trailer 10 in the traveling and the camping positions 12, 14. The support assembly 204 also has at least a plurality of support plates 212 that move relative to the support base 210. In an extended position of the retractable wheel assembly 200 shown in FIG. 12, the plurality of support plates 212 is spaced apart from one another (FIG. 13). As the retractable wheel assembly 200 moves toward a retracted position 214 shown in FIG. 11, the plurality of support plates 212 move toward one another so that the ends closest to the wheels 202 are aligned with each lateral end of the support 210 (FIG. 14). In the embodiment illustrated, support plates 212 are in the same plane.

The outer ends of the support plates 212 are connected to the wheels 202 of the trailer 10 by way of a torsion spindle assembly having a torsion spring 218, an arm 220 and a spindle 222. The wheels 202 move horizontally when the support plates 212 either move toward or away from one another. Displacement of the plurality of support plates 212 toward and away is guided through guides 224. Each guide 224 is connected to the support base 210 and herein includes four guide supports 226.

As illustrated in FIG. 13, movement of the support plates 212 toward and away from each other is provided by a drive actuator 248 and link assembly 208. Link assembly 208 includes two similarly-constructed link sub-assemblies 231a and 231b that are mirror images of one another. The two link sub-assemblies 231a and 231b extend along each side of an axis of symmetry 242. Link sub-assembly 231a includes a link arm 236, a lever arm 238, a link 236, wherein a pin 232 connects the link 236 to a slot 234 extending within the support base 210, and a drive element 251. The link arm 236 moves along with the pin 232, where the pin 232 moves within the slot 234. Link arm 236 is connected to the lever arm 238 by way of a pin 241, and lever arm 238 is connected to the drive link 244 by way of a pin 243. Drive link 244 is connected to the drive element 251. A threaded screw 250 is threadably connected to the drive element 251 to form the drive actuator 248 where rotation of the threaded screw 250 causes the drive element to move toward and away from the support plate 210.

It should be understood that other forms of actuators could be used, such as, but not limited to, hydraulic, electric and pneumatic based actuators.

At this point it should be noted that the retractable wheel assembly 200 includes a single actuating assembly. In other words, a single device which when actuated causes simultaneous movement of both wheels 202 inwardly or outwardly. In this embodiment, the single actuating assembly comprises drive actuator 248.

Figure 15B:
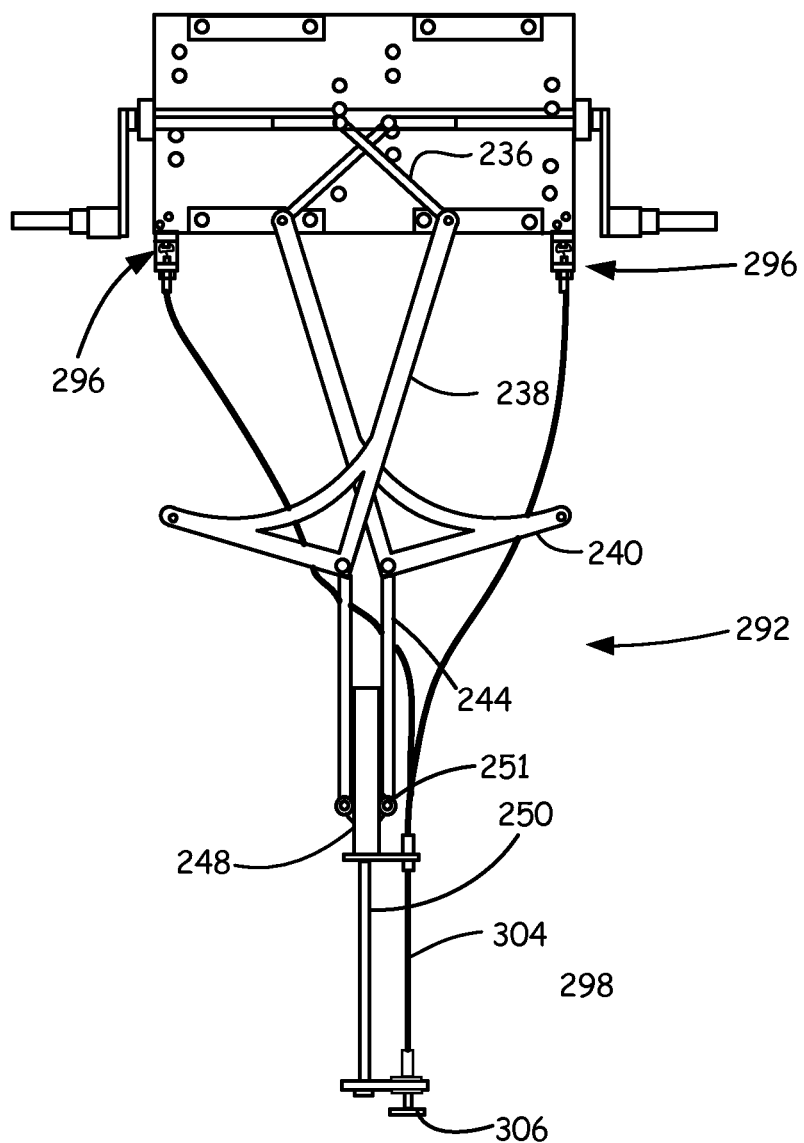
FIG. 15B is a top plan view of the retractable wheel assembly of FIG. 13.

Each lever arm 238 pivots about a stationary pivot 245. As drive link 244 moves toward the support base 210, support plates 212 are pushed out or away from each other. Similarly, as drive link 244 moves away from the support base 210, support plates 212 are drawn in toward one another. When the support assembly 204 is in the extended position, link sub-assemblies 231a and 231b are on opposite sides of axis of symmetry 242 and the lever arms 238 extend alongside the axis of symmetry 242. When the support assembly 204 is in the retracted position, link arms 236 move toward each other and cross as lever arms 238 pivot in order to increase the force applied to moving the support plates 212. FIGS. 15A, 15B and 15C, illustrate movement of the link sub-assemblies 231a and 231b. It should be noted that lever arms 238 overlap but travel in separate, parallel planes that extend horizontally so that as lever arms 238 move toward and away from one another, lever arms 238 never actually establish contact.

Figure 19:
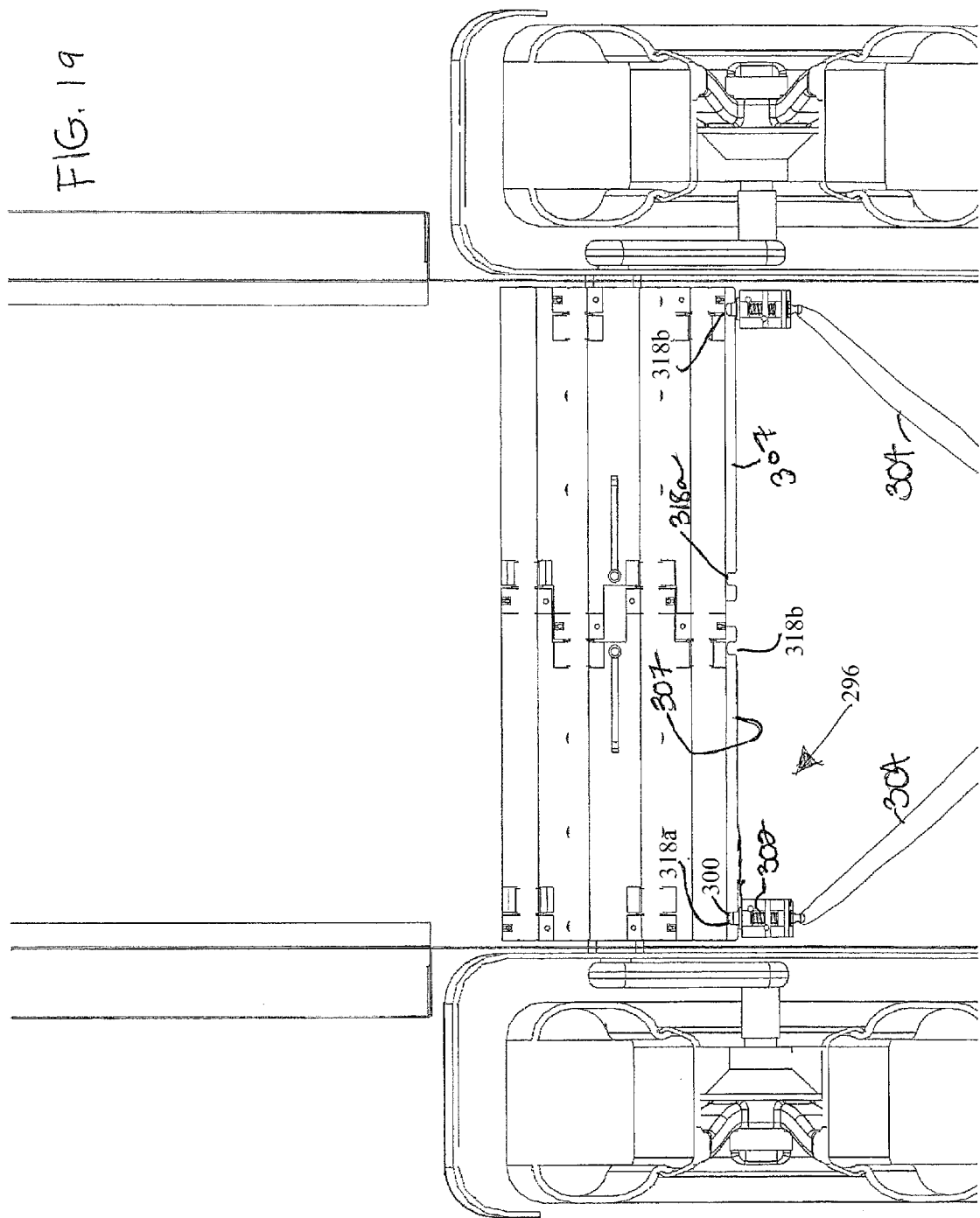
FIG. 19 is a sectional view of trailer.
Figure 20:
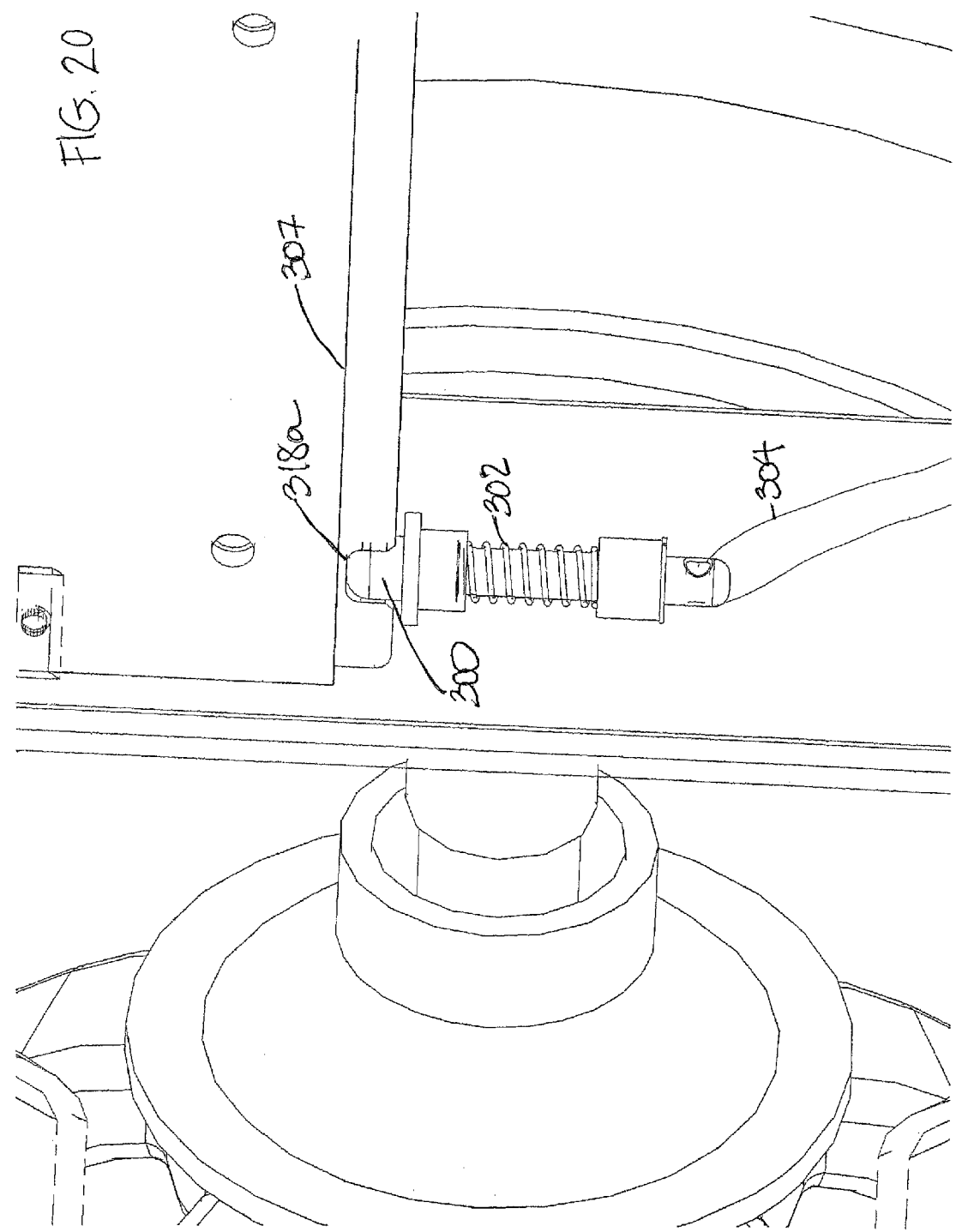
FIG. 20 is an enlarged view of a retractable pin of a locking device with other portions removed.

FIGS. 15B and 16-20 further illustrate an axle locking mechanism 292. The axle locking mechanism 292 holds the support plates 212 in retracted and expanded positions. The axle locking mechanism 292 includes locking assemblies 296 and an actuating assembly 298. Referring to FIGS. 19-20, the locking assembly 296 includes a plurality of locking devices 300 such as a pin or lever connected to an actuating wire or cable 304. A lock plate 307 is secured to each of the support plates 212 and includes recesses 318a and 318b to hold the support plate 212 in the retracted and expanded positions, respectively. A spring 302 can be coupled to each locking device 300 so as to bias the locking device 300 to the locked position, either in recess 318a or recess 318b.

Referring to FIGS. 16-18, the actuating assembly 298 includes an axle lock plate 305, an axle lock handle 306, a spacer 310, and a pull rod 314 connecting the spacer 310 to the cable 304. In a first position, when the axle lock handle 306 is pulled, pins 300 are also pulled back against the bias of the springs 302. In particular, the axle lock handle 306 is pulled with spacer 310 aligned with slot 316 such that spacer 310 is pulled therethrough. The axle lock handle 306 can then be turned, for example 90 degrees, so that the spacer 310 engages plate 305 because of the bias of the springs 302 pulling the handle 306 toward the plate 305. This will ensure that the pins 300 are held back and are prevented from entering the recesses 318a or 318b. In this position of the actuating assembly 298, the wheels 202 can be expanded or retracted. Typically, at some point during adjustment of the wheels 202, the axle lock handle 306 is turned back so as to align spacer 310 with slot 316. However, since the pins 300 are not aligned with either of the recesses 318a or 318b, the pins 300 will slide along the lock plates 307 with expansion or retraction of the wheels 202. When the pins 300 are aligned with either notch 318A or notch 318B due to movement of support plates 212, the spring 302 will force the pins 300 into one of notches 318A or 318B to secure the position of the support plates 212

Figure 21:
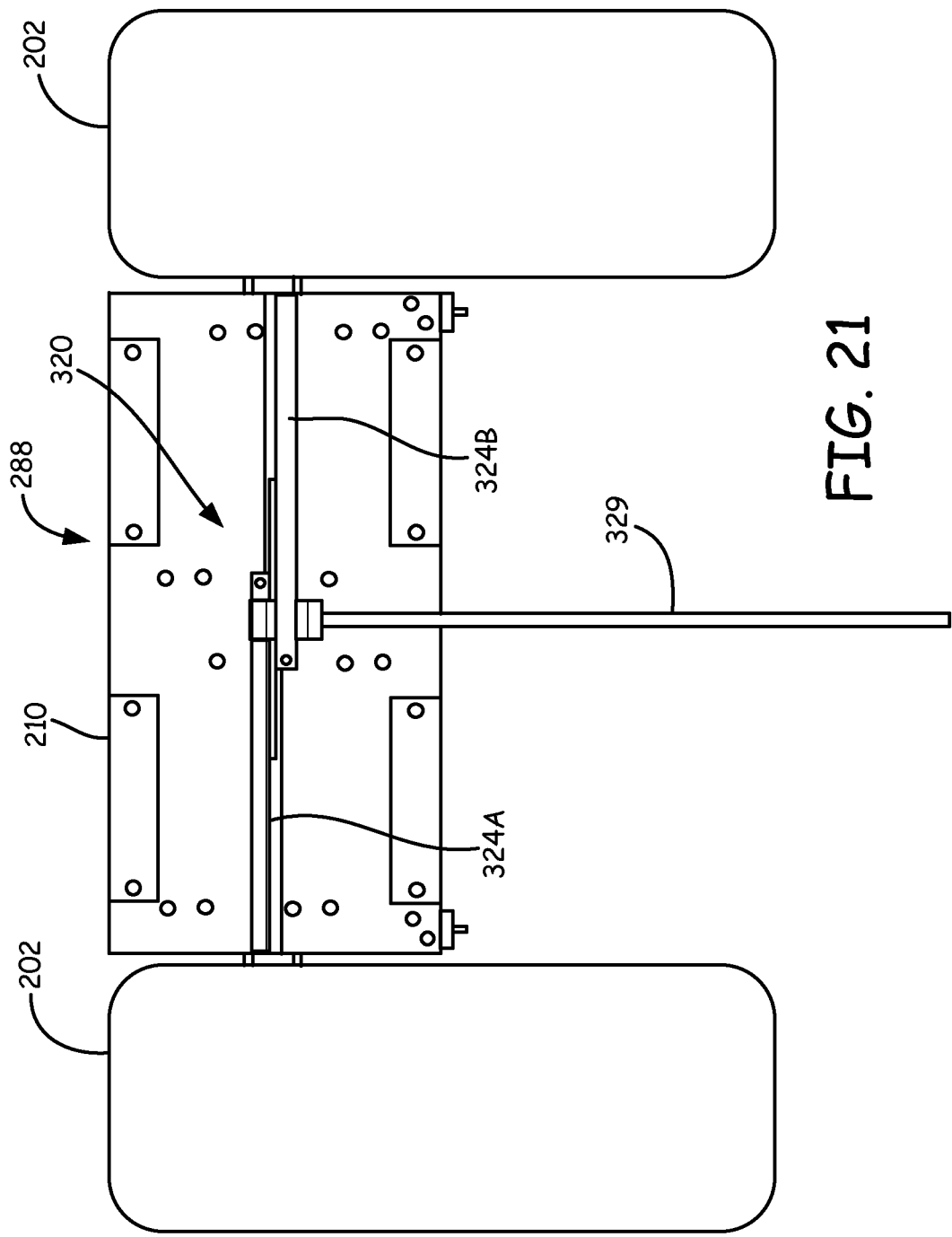
FIG. 21 is a top plan view of a second embodiment of a retractable wheel assembly with portions removed.
Figure 22:
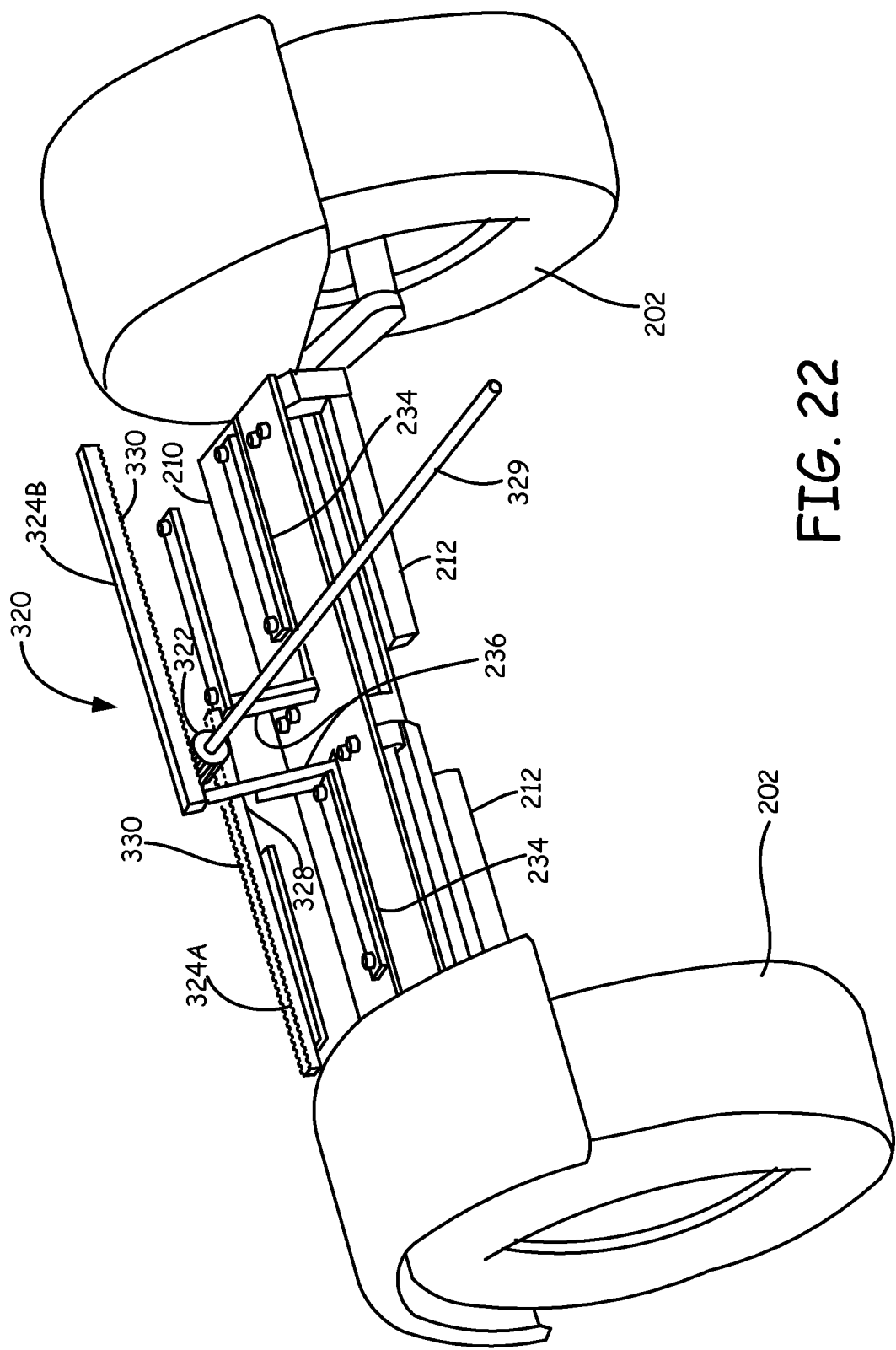
FIG. 22 is a perspective view of the second embodiment of the retractable wheel assembly of FIG. 21 with portions removed.
Figure 23:
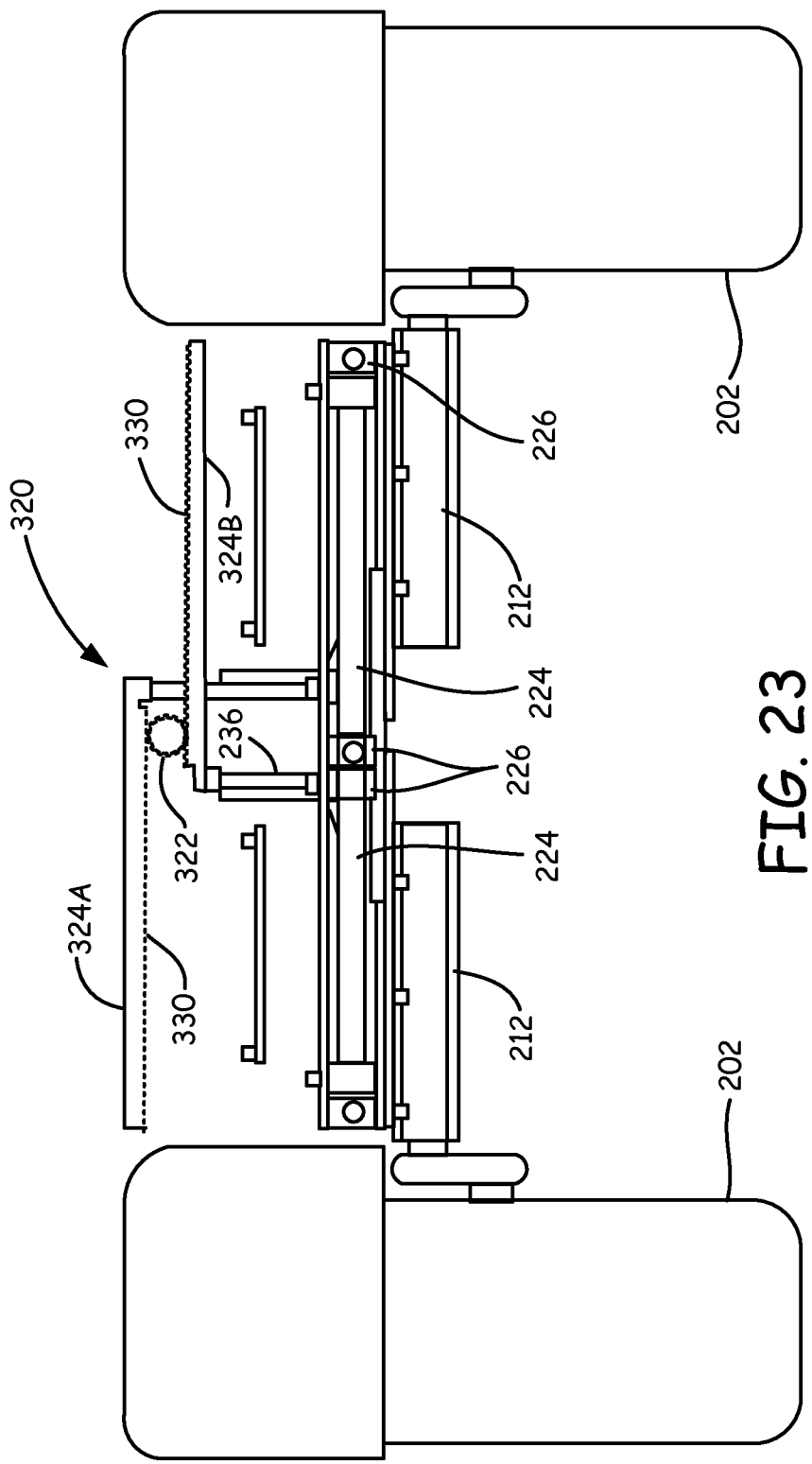
FIG. 23 is an rear elevational view of the second embodiment of the retractable wheel assembly with portions removed.

FIGS. 21-23 show another embodiment of a retractable wheel assembly 288 with a single actuating assembly. In this embodiment, the single actuating assembly comprises a rack-and-pinion mechanism 320 where other components having the same function as the previous embodiment have been identified with the same reference numbers. The rack-and-pinion mechanism 320 has a circular gear 322 (also referred to as "the pinion") and two linear gears 324A and 324B (also referred to as "racks"). The pinion 322 is an external gear secured to rod 329, which is rotated by the user, similar to rod 251 of the previous embodiment. The linear gears 324A and 324B are straight bars with teeth 330 on one side. When the rod 329 causes rotational motion to be applied to the pinion 322, the pinion 322 rotates and the teeth of the pinion 322 engage the teeth of the linear gears 324A and 324B, causing the linear gears 324A and 324B to move sideways in opposite directions from one another. The ends of linear gears 324 are connected to the link arms 236, which move within slot openings 234. The link arms 236 are joined to the support plates 212. Hence, as the linear gears 324 move sideways, the link arms 236 also move sideways in the slot openings 234 toward or away from one another. As with the link assembly of the previous embodiment, the rack-and-pinion mechanism 320 operates to move both wheels 202 of the trailer 10 simultaneously in or out.

Figure 24:
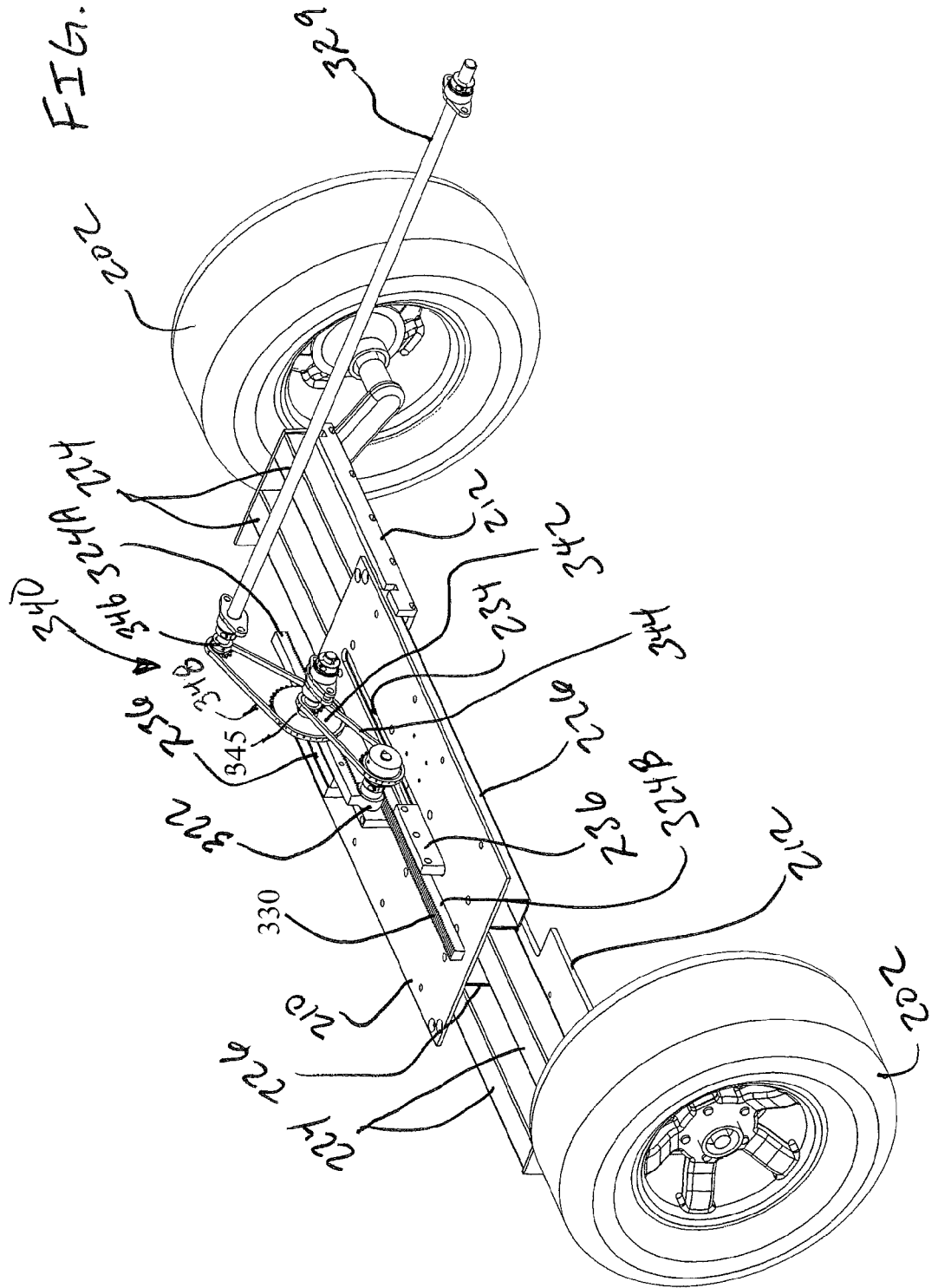
FIGS. 24 and 25 are perspective views of a variation of the second embodiment of the retractable wheel assembly with portions removed.
Figure 25:
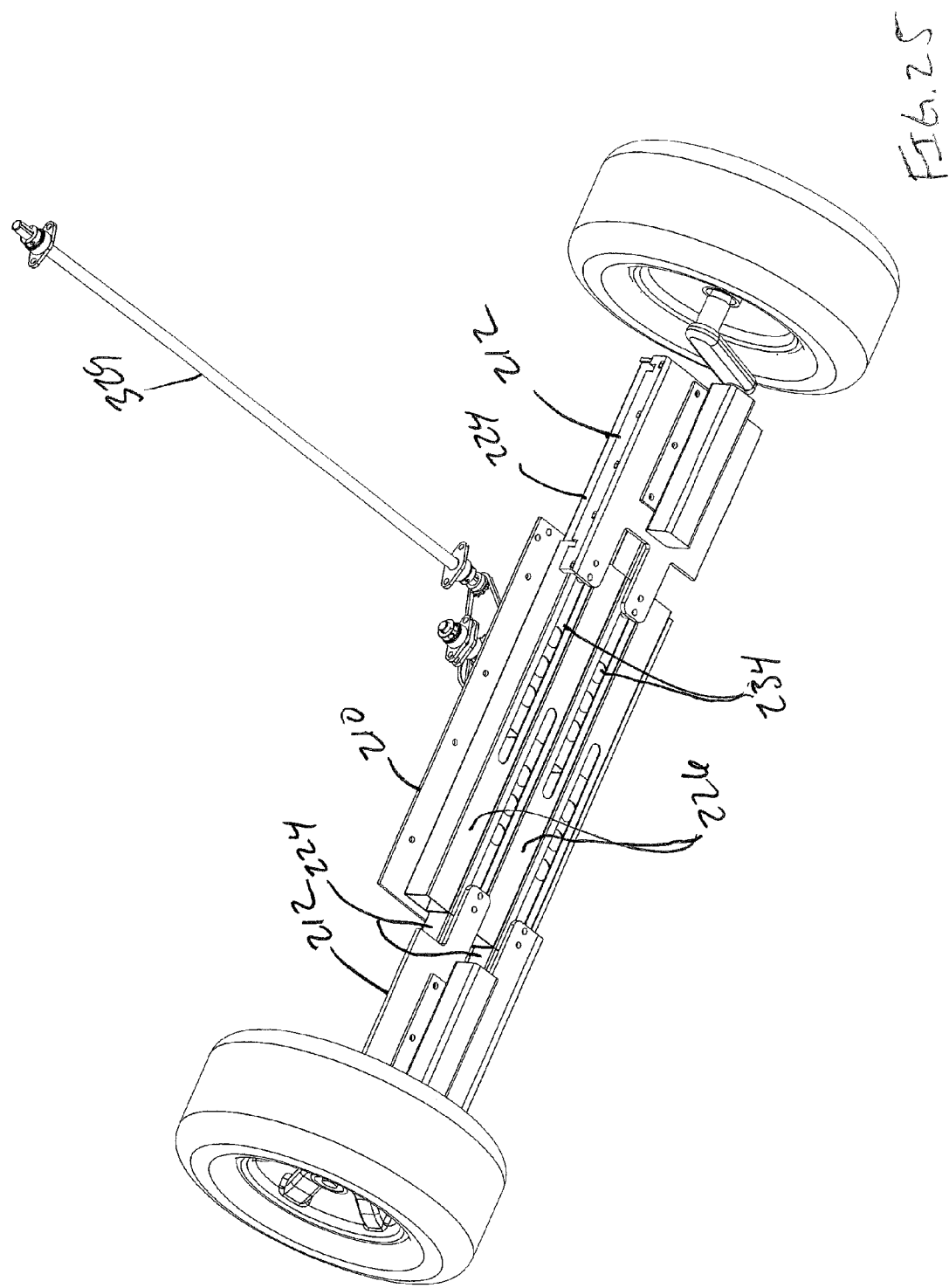

FIGS. 24-25 illustrate a variant of a pinion and rack mechanism 340 where components having similar function are identified with the same reference numbers of the previous embodiments. In this embodiment, the pinion gear 322 has increased torque due to the presence of a larger diameter drive disc, herein a gear 342 coupled thereto by a chain 344 (or other endless member such as a belt) with a smaller gear 345 rotating at the same speed as gear 342 by being mounted on a common shaft. Gear 342 is driven by rotation of shaft 329 by the user through gear 346 and chain 348. Multiple revolutions of the smaller gear 345 are needed to cause a single revolution of the larger diameter gear 342. Advantageously the gears and chain(s), or belts and pulleys, allow the shaft 329 to be located at a higher position relative to the spindles of the wheels 202 so as to provide easier manipulation by the user. Stated yet another way, the drive shaft 329 is laterally offset from the pinion gear 322 and disposed at a height above the support base 210 greater than a height of the pinion gear 322 above the support base 210.

As appreciated by those skilled in the art the endless members, herein chains, can be removed with direct connection of the rotatable drive disc members. It should be noted supports for the shaft 329, gear 346, gears 342, 345 and pinion gear 322 have been removed for purposes of clearer understanding.

Figure 26:
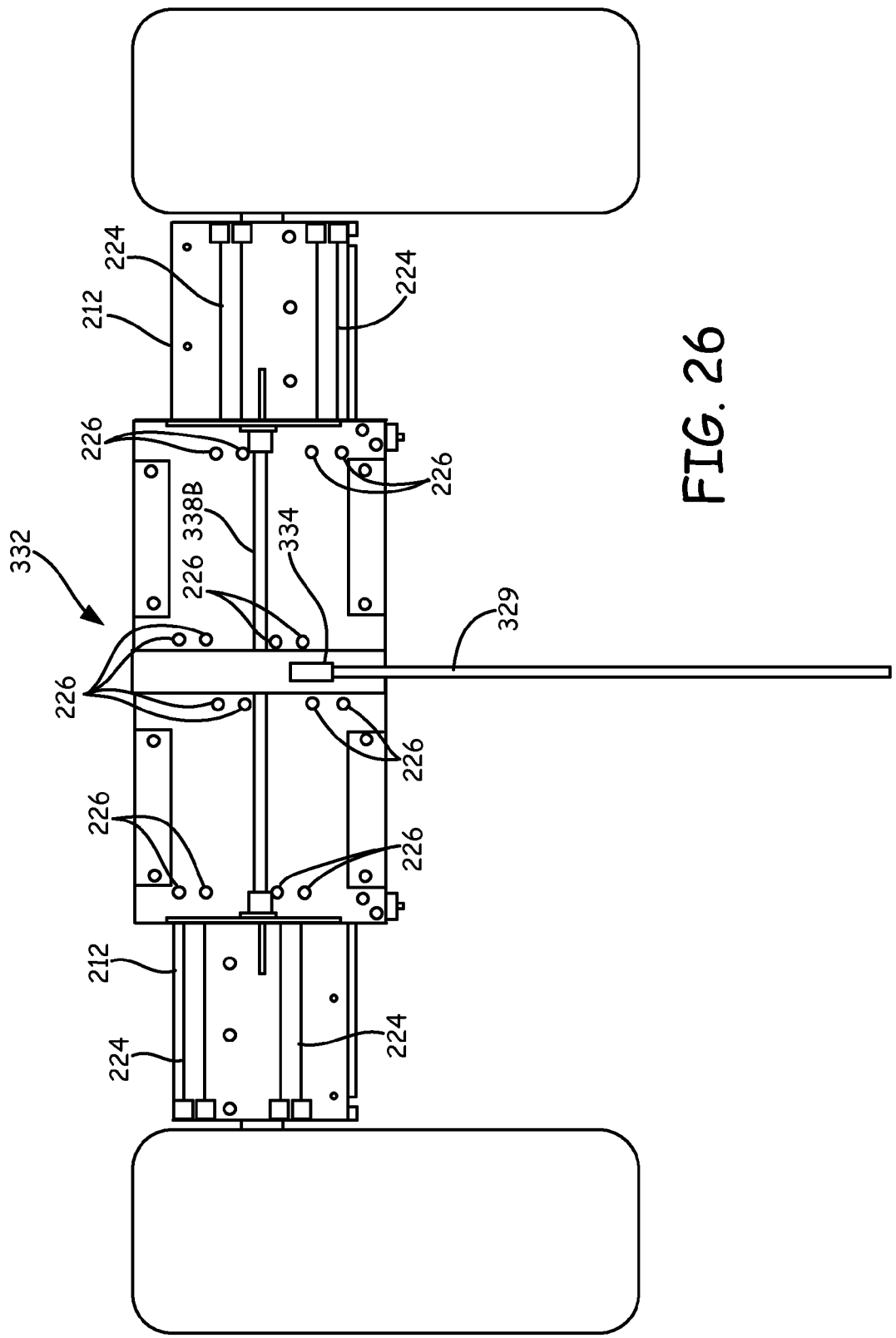
FIG. 26 is a top plan view of a third embodiment of a retractable wheel assembly.
Figure 27:
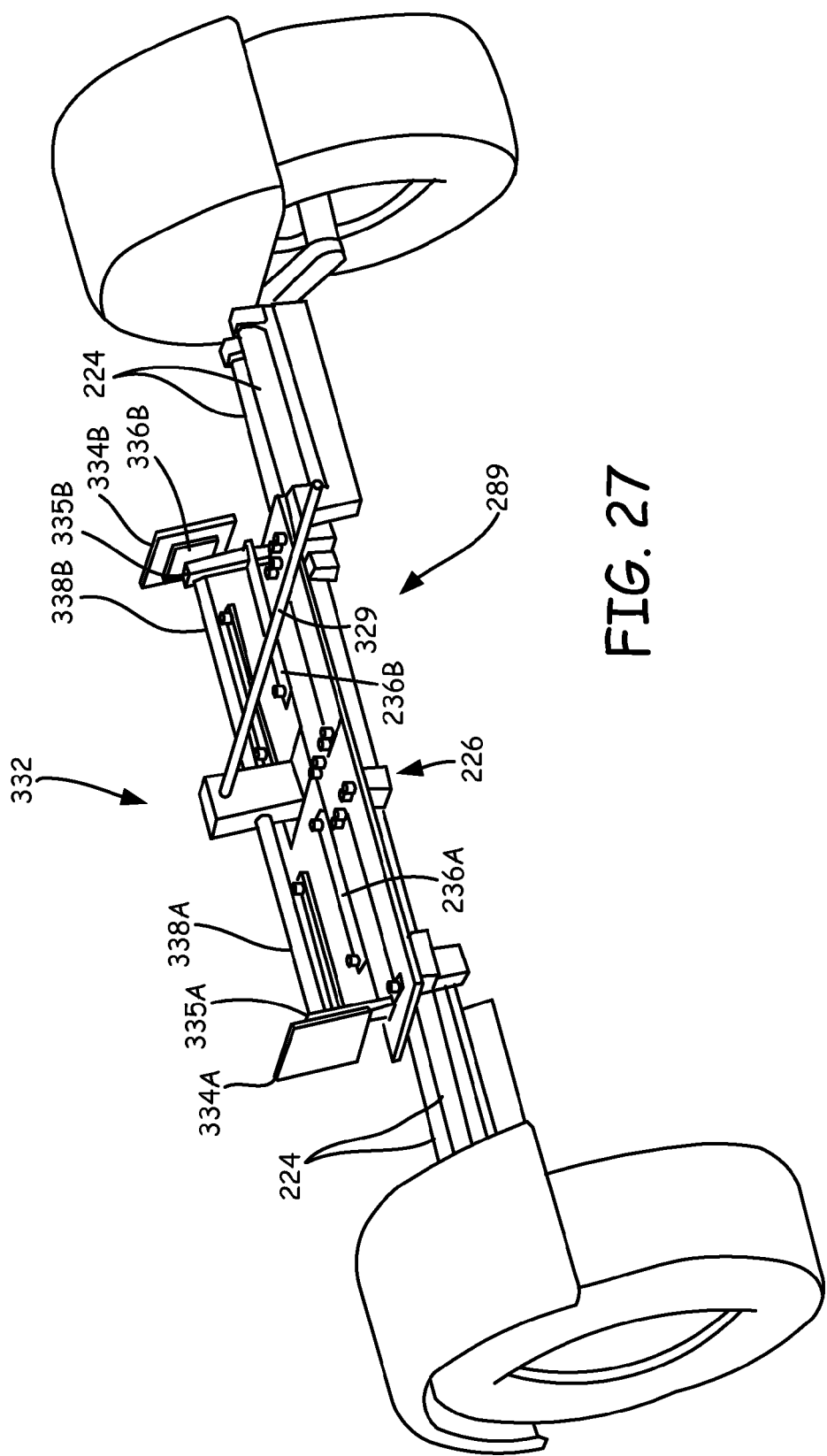
FIG. 27 is a perspective view of the third embodiment of the retractable wheel assembly of FIG. 26 with portions removed.

FIGS. 26-27 illustrate another embodiment of a retractable wheel assembly 289 with a single actuating assembly. In this embodiment, the single actuating assembly comprises a worm or pinion gear mechanism 332. The worm or pinion gear mechanism 332 includes a gear assembly similar to a vehicle differential that being a pinion gear connected to shaft 329, which rotates a gear on each of threaded shafts 338A and 338B. The ends of shafts 338A and 338B are rotatably mounted with bearings 336A and 336B to mounting plates 334A and 334B that are secured to portions of the trailer 10 not shown, thus allowing shafts 338A and 338B to rotate when driven by the pinion gear connected to shaft 329. The link arms 236A and 236B are coupled to the shafts 338A and 338B via nuts 335A and 335B, respectively, threadably mating with shafts 338A and 338B, respectively. With rotation of the shafts 338A, 338B, the nuts 335A, 335B are displaced thereby moving the drive links 236A, 236B and support plates 212 attached thereto. The worm gear mechanism 332 achieves high torque at a low speed and causes simultaneous movement of both wheels 202 inwardly or outwardly.

Figure 28:
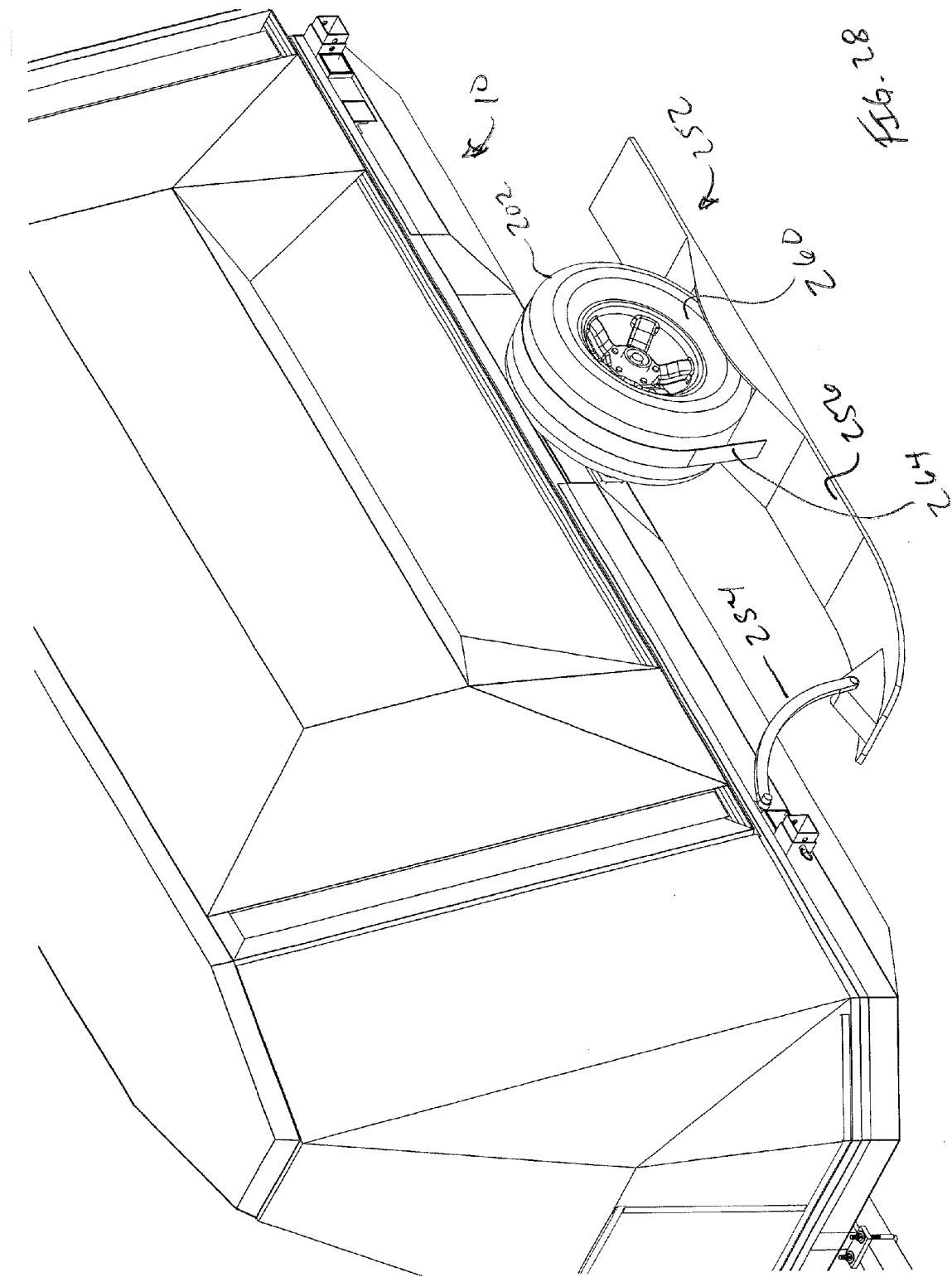
FIG. 28 is a perspective view of a ski assembly connected to the trailer.

In one configuration shown in FIG. 28, the trailer 10 has a ski assembly 252 for each wheel 202 designed to aid the trailer 10 to slide smoothly over snow. The ski assembly 252 is joined to the trailer frame 20 by way of a forward stabilizing link 254 pivotally fixed to a front portion of a ski 256. An end of the forward stabilizing link 254 remote from the ski 256 is removably, pivotally fixed to the trailer frame 20. The ski 256 is configured to receive a tire 260 of the wheel 202. The vertical, longitudinal, and lateral movement of each tire 202 is constrained with a strap 264 extending over the top of the tire 202 in order to secure it in place. The ends of the strap 264 are connected to the ski 256. The forward stabilizing link 254 in combination with the compliance of the torsion supported spindle for the wheel 202, the ski 256 and the trailer frame 20 forms a four bar linkage allowing flexibility but also providing sufficient rigidity. In particular, the front stabilizer link 254 allows the ski 256 to flex with the torsion spindle but remain stable without excess rotation relative to the wheel axis. The forward stabilizing link 254 inhibits the front of the ski 256 from digging into the snow with movement of the trailer 10 over the snow.

Figure 29:
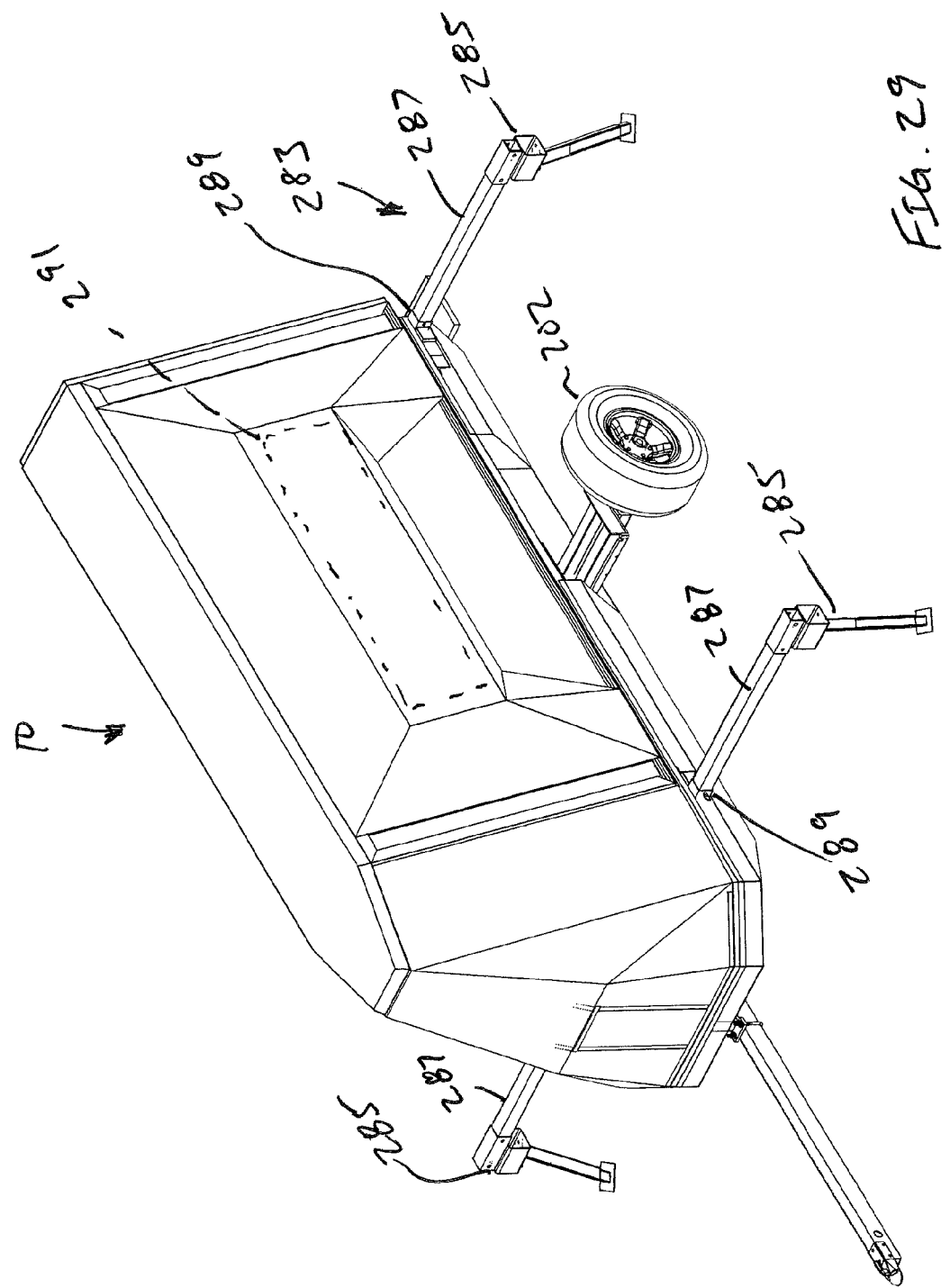
FIG. 29 is a perspective view of the trailer with a second embodiment of stabilizing supports.

FIG. 29 illustrates a second embodiment of a stabilizing support system 283. In this embodiment lateral support members 285 (e.g. adjustable in length) are mounted to extensions 287 that are removably, fixedly connected to the trailer frame 20. In the embodiment illustrated, the trailer frame 20 includes receivers 289, each of which is configured to receive a portion of one of the extensions 287. The stabilizing support system 283 is particularly advantageous because the trailer 10 can be leveled in the folded transport position, rather than leveled after the platforms 40 have been lowered as in the previous embodiment of FIGS. 1 and 2. In addition, rather than providing support on the outer edges of the platforms 40, the platforms 40 can rest upon and along the length of the extensions 287. If desired, all or just the rear pair of lateral support members 285 and extensions 287 can be installed to remove at least some of the weight off the wheels 202 during expansion and/or retraction of the retractable wheel assembly. In one embodiment, the lateral support members 285 and extensions 287 can be stored as pairs in compartments 291 provided on the outwardly facing surfaces of the primary platforms 40.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

What is claimed is:

1. A trailer, comprising:
a trailer frame having a hitch;
a stationary support base joined to the trailer frame;
two support plates slidably guided on the support base toward and away from each other;
a pair of wheel assemblies, wherein a wheel assembly is mounted to an end of each of the support plates remote from the other support plate such that a distance between the wheel assemblies varies with movement of the support plates on the support base;
a pair of drive links wherein a drive link is joined to each of the support plates;
a drive mechanism having a movable member joined to the drive links and configured to selectively move the support plates simultaneously toward each other when the movable member is moved in a first direction or simultaneously away from each other when the movable member is moved in a second direction.

2. The trailer of claim 1 wherein the drive mechanism comprises a rack and pinion mechanism with a drive shaft, the rack and pinion mechanism including a rack secured to each of the drive links and a pinion gear operably coupled to each of the racks wherein selective rotation of the drive shaft in the first direction causes simultaneous movement of the racks toward each other and wherein selective rotation of the drive shaft in the second direction causes simultaneous movement of the racks away from each other.

3. The trailer of claim 2 wherein the drive mechanism comprises a rotatable disc member having a diameter larger than the pinion gear operably coupled to the pinion gear and a further rotatable disc member operably coupled to the rotatable disc member having the larger diameter wherein multiple revolutions of the further rotatable disc member are needed to cause a single revolution of the rotatable disc member having the larger diameter.

4. The trailer of claim 3 wherein the drive shaft is secured to the further rotatable disc member, the drive shaft being laterally offset from the pinion gear.

5. The trailer of claim 4 and further comprising an first endless member operably coupling the pinion gear to the rotatable disc member having a diameter larger than the pinion gear.

6. The trailer of claim 5 and further comprising a second endless member operably coupling the rotatable disc member having a diameter larger than the pinion gear and the further rotatable disc member secured to the drive shaft.

7. The trailer of claim 1 and further comprising a locking device to selectively lock each support plate to the support base in a first position where the wheel assemblies are furthest from each other and a second position where the wheel assemblies are closer to each other.

8. The trailer of claim 7 wherein each locking device comprises a member selectively engagable with a recess in each of the first and second positions.

9. The trailer of claim 8 and further comprising a locking handle disposed proximate a user operated drive element for the drive mechanism, the locking handle being connected to each of the members with a cable, and wherein each of the members is spring biased for engagement with the recesses.

10. A trailer, comprising:
a trailer frame having a hitch;
a stationary support base joined to the trailer frame;
two support plates slidably guided on the support base toward and away from each other;
a pair of wheel assemblies, wherein a wheel assembly is mounted to an end of each of the support plates remote from the other support plate such that a distance between the wheel assemblies varies with movement of the support plates on the support base:
a pair of drive links wherein a drive link is joined to each of the support plates;
a drive mechanism joined to the drive links and configured to selectively move the support plates toward or away from each other;
a floor secured to the frame;
two wall assemblies wherein the wall assemblies are disposed opposite each other and pivotally joined to the floor with a hinge, each wall assembly being movable from a first position wherein the wall assembly is lying parallel to the floor to a second position where the wall assembly is substantially perpendicular to the floor; and
a canopy joined to extending between the wall assemblies to form an enclosure, the canopy comprising an outer fabric material and an inner fabric material spaced apart from the outer fabric material, each of the outer fabric materials connected to and extending between the wall assemblies, wherein each of the outer fabric material and the inner fabric material is fixedly connected to the wall assemblies from when each of the wall assemblies is in the first position to when each of the wall assemblies is in the second position, and wherein each of the wall assemblies includes a slotted channel for each of the outer fabric material and the inner fabric material, wherein material of each of the outer fabric material and the inner fabric material extend out of a slot of each corresponding slotted channel.

11. The trailer of claim 10 wherein the slotted channels for the outer fabric material and the inner fabric material are integral being formed from a single unitary body.

12. The trailer of claim 11 the slotted channel for the outer fabric material is disposed along an edge of the wall assemblies and wherein the slotted channel for the inner fabric material is disposed adjacent surfaces of the wall assemblies facing each other.

13. The trailer of claim 10 wherein each wall assembly includes a plurality of wall segments joined with a flexible hinge that extends vertically when the wall assembly is in the second position, and wherein separate slotted channels for each of the outer fabric material and the inner fabric material are provided on each of the wall segments.

14. The trailer of claim 13 wherein the canopy includes a cover joined to the outer fabric material and is disposed to cover an upper end of the hinge when the wall assembly is disposed in the second position.

15. A trailer, comprising:
a trailer frame having a hitch;
a stationary support base joined to the trailer frame;
two support plates slidably guided on the support base toward and away from each other;
a pair of wheel assemblies, wherein a wheel assembly is mounted to an end of each of the support plates remote from the other support plate such that a distance between the wheel assemblies varies with movement of the support plates on the support base;
a pair of drive links wherein a drive link is joined to each of the support plates;
a drive mechanism joined to the drive links and configured to selectively move the support plates toward or away from each other;
a floor secured to the frame;
two wall assemblies wherein the wall assemblies are disposed opposite each other and pivotally joined to the floor with a hinge, each wall assembly being movable from a first position wherein the wall assembly is lying parallel to the floor to a second position where the wall assembly is substantially perpendicular to the floor; and
a canopy joined to extending between the wall assemblies to form an enclosure, the canopy comprising an outer fabric material and an inner fabric material spaced apart from the outer fabric material, each of the outer fabric materials connected to and extending between the wall assemblies, wherein each of the outer fabric material and the inner fabric material is fixedly connected to the wall assemblies from when each of the wall assemblies is in the first position to when each of the wall assemblies is in the second position, wherein each of the outer fabric material and the inner fabric material is fixedly connected to the floor from when each of the wall assemblies is in the first position to when each of the wall assemblies is in the first position, and wherein the floor includes spaced apart edges extending along opposite sides of the floor between the wall assemblies and wherein each of the edges includes a slotted channel for each of the outer fabric material and the inner fabric material, wherein material of each of the outer fabric material and the inner fabric material extend out of a slot of each corresponding slotted channel.

16. The trailer of claim 15 wherein the floor comprises a plurality of platforms including a stationary middle platform secured to the trailer frame and a movable platform pivotable relative to the stationary platform on each side, each of the movable platforms being secured the stationary platform with a hinge, wherein the space apart edges are disposed along outermost edges of the movable platforms when the movable platforms are oriented to be substantially in the same plane as the stationary platform.

17. The trailer of claim 1 and further comprising:
a ski for each of the wheel assemblies, the ski configured to receive and be secured to one of the tire and wheel assemblies; and
a front link pivotally connected to the trailer frame at a first end and pivotally connected to a front portion of the ski for forward motion of the trailer.

* * * * *